US006799277B2

(12) United States Patent
Colvin

(10) Patent No.: US 6,799,277 B2
(45) Date of Patent: *Sep. 28, 2004

(54) SYSTEM AND METHOD FOR MONITORING SOFTWARE

(75) Inventor: David S. Colvin, Commerce Township, MI (US)

(73) Assignee: z4 Technologies, Inc., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,819

(22) Filed: Mar. 27, 2001

(65) Prior Publication Data

US 2001/0034712 A1 Oct. 25, 2001

Related U.S. Application Data

(63) Continuation-in-part of application No. 09/535,321, filed on Mar. 27, 2000, now Pat. No. 6,460,142, which is a continuation of application No. 09/090,620, filed on Jun. 4, 1998, now Pat. No. 6,044,471.
(60) Provisional application No. 60/192,284, filed on Mar. 27, 2000.

(51) Int. Cl.[7] .................................................. H04L 9/32
(52) U.S. Cl. ......................................... 713/202; 705/51
(58) Field of Search ................................. 713/200, 201, 713/202, 193; 709/229; 705/14.51, 52, 53, 55, 57, 59

(56) References Cited

U.S. PATENT DOCUMENTS

| | | | |
|---|---|---|---|
| 4,796,220 A | | 1/1989 | Wolfe |
| 4,827,508 A | * | 5/1989 | Shear ........................... 705/53 |
| 5,014,234 A | | 5/1991 | Edwards, Jr. |
| 5,182,770 A | | 1/1993 | Medveczky et al. |
| 5,199,066 A | | 3/1993 | Logan |
| 5,287,408 A | | 2/1994 | Samson |
| 5,341,429 A | | 8/1994 | Stringer et al. |
| 5,495,411 A | | 2/1996 | Ananda |
| 5,509,070 A | | 4/1996 | Schull |
| 5,548,645 A | | 8/1996 | Ananda |
| 5,553,139 A | * | 9/1996 | Ross et al. ..................... 705/59 |
| 5,564,038 A | | 10/1996 | Grantz et al. |
| 5,579,479 A | | 11/1996 | Plum |
| 5,606,614 A | | 2/1997 | Brady et al. |
| 5,638,513 A | | 6/1997 | Ananda |
| 5,652,793 A | | 7/1997 | Priem et al. |
| 5,717,756 A | | 2/1998 | Coleman |
| 5,771,347 A | | 6/1998 | Grantz et al. |

(List continued on next page.)

OTHER PUBLICATIONS

Garceau et al, "General controls in a local area network" Feb. 1995, Ohio CPA Journal, vol. 54, #1, p. 24–29.*
Magid, "Software Rentals Revisited—The growth of the Internet, intranets, and extranets has revived the concept of renting software—and added a twist." Aug. 18, 1997, Informationweek, n. 644, p. 132.
Li et al, Matlab Tutorial Jan. 3, 1999, http://www.me.umn-.edu/courses/em4232/tutorial.html.

(List continued on next page.)

Primary Examiner—Ayaz Sheikh
Assistant Examiner—Christopher Revak
(74) Attorney, Agent, or Firm—Brooks Kushman P.C.

(57) ABSTRACT

Systems and methods for monitoring, testing, distribution, and use of computer software with associated methods and systems for repeatedly contacting a software user and exchanging information, such as passwords, authorization information, marketing, advertising, or promotional information include associating a list of passwords with each copy or group of copies of computer software which must be entered at predetermined intervals to provide continued use of the software. Software monitoring and network license metering may be providing by storing information relative to software operation on a local computer or server and transferring the information to a remote computer or server at predetermined intervals.

40 Claims, 17 Drawing Sheets

U.S. PATENT DOCUMENTS

| | | | |
|---|---|---|---|
| 5,790,664 A | * 8/1998 | Coley et al. ................. 709/203 |
| 5,812,764 A | 9/1998 | Heinz, Sr. |
| 5,842,124 A | 11/1998 | Kenagy et al. |
| 5,845,065 A | 12/1998 | Conte et al. |
| 5,845,077 A | 12/1998 | Fawcett |
| 5,848,397 A | 12/1998 | Marsh et al. |
| 5,862,299 A | * 1/1999 | Lee et al. ...................... 386/94 |
| 5,870,543 A | 2/1999 | Ronning |
| 5,870,610 A | 2/1999 | Beyda |
| 5,931,901 A | 8/1999 | Wolfe et al. |
| 5,940,074 A | 8/1999 | Britt, Jr. et al. |
| 5,974,454 A | 10/1999 | Apfel et al. |
| 5,974,461 A | 10/1999 | Goldman et al. |
| 5,991,402 A | 11/1999 | Jia et al. |
| 6,023,268 A | 2/2000 | Britt, Jr. et al. |
| 6,029,145 A | 2/2000 | Barritz et al. |
| 6,049,671 A | 4/2000 | Slivka et al. |
| 6,068,156 A | 5/2000 | Liff et al. |
| 6,073,214 A | 6/2000 | Fawcett |
| 6,134,593 A | * 10/2000 | Alexander et al. .......... 709/229 |
| 6,182,144 B1 | 1/2001 | England |
| 6,349,335 B1 | 2/2002 | Jenney |
| 6,697,948 B1 | * 2/2004 | Rabin et al. ................. 713/200 |

OTHER PUBLICATIONS

Gomes, "Rumor About Windows 95 snooping program refuses to die" Aug. 17, 1995, The Gazette.

Duncan, "What's New in NetWare 3.2", Feb. 1998, Novell Research, pp. 1–12.

* cited by examiner

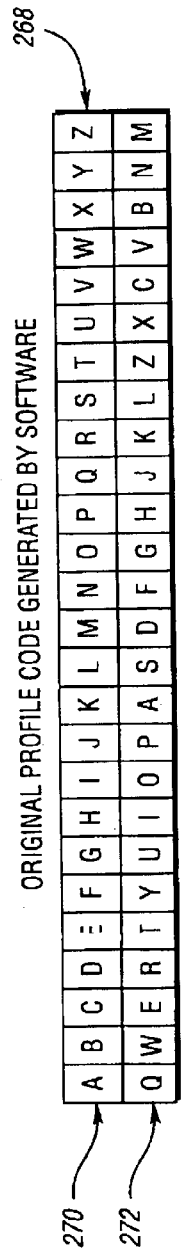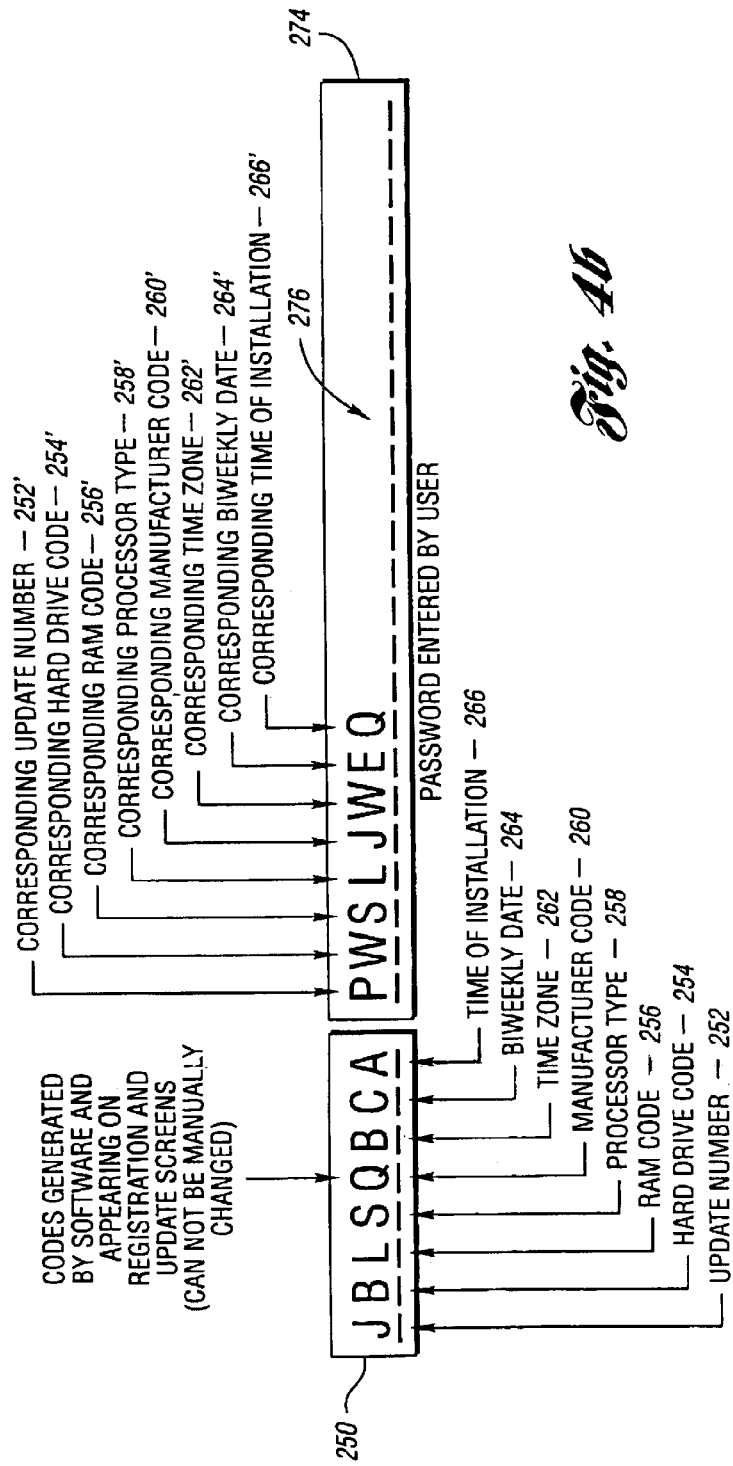
Fig. 4a
Fig. 4b

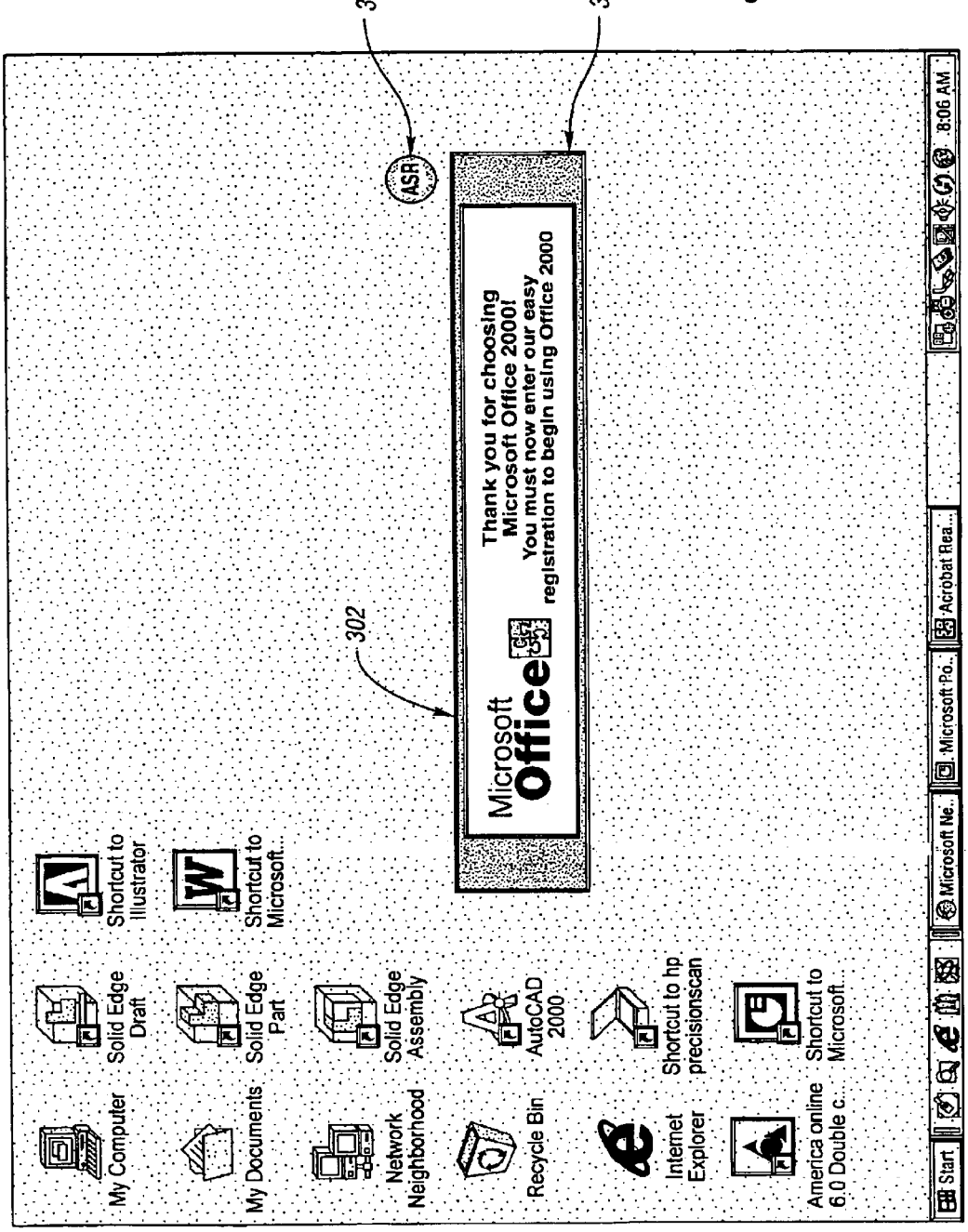

1. PROCESS ADMINISTRATORS: — 530

- 532 — (a) LOGIN ID.
- 534 — (b) PASSWORD.
- 536 — (c) FULL NAME.
- 538 — (d) ACCESS RIGHT.
- 540 — (e) DATE OF LAST PASSWORD CHANGE.
- 542 — (f) HASHED PASSWORD HISTORY.

2. CATALOG OF PROTECTED SOFTWARE PROGRAMS: — 550

- 552 — (a) UNIQUE PROGRAM IDENTIFIERS.
- 554 — (b) NAMES.
- 556 — (c) VENDOR INFORMATION.
- 558 — (d) REVISION INFORMATION.
- 560 — (e) PRIVATE AND PUBLIC KEYS USED FOR EACH PROGRAM.

3. ACTIVATION KEY DATABASE — 570

- 572 — (a) PROGRAM IDENTIFIER.
- 574 — (b) ACTIVATION KEY.
- 576 — (c) CREATION DATE.
- 578 — (d) CUSTOMER ID (INITIAL BLANK).

4. CLIENT DATABASE — 590

- 592 — (a) UNIQUE RANDOM IDENTIFIER.
- 594 — (b) NAME.
- 596 — (c) ADDRESS.
- 598 — (d) PHONE AND FAX NUMBERS
- 600 — (e) E-MAIL ADDRESS.
- 602 — (f) FIRST REGISTRATION DATE.
- 604 — (g) DEMOGRAPHIC AND MARKETING INFORMATION.

5. CLIENT/PROGRAM/LICENSE DATABASE. — 610

- 612 — (a) CLIENT ID.
- 614 — (b) PROGRAM ID.
- 616 — (c) FIRST SUCCESSFUL DOWNLOAD.
- 618 — (d) FIRST UNSUCCESSFUL DOWNLOAD.
- 620 — (e) LAST SUCCESSFUL DOWNLOAD.
- 622 — (f) LAST UNSUCCESSFUL DOWNLOAD.

*Fig. 13a*

624 — (g) CURRENT LICENSE EXPIRES DATE.
626 — (h) STATUS (ACTIVE/REVOKED)

6. EVENT LOG: — 630

632 — (a) ADMINISTRATOR ID.
634 — (b) CLIENT ID.
636 — (c) PROGRAM ID.
638 — (d) ACTIVATION KEY.
640 — (e) DATE/TIME.
642 — (f) TYPE CODE.
646 — (g) DETAIL TEXT.

*Fig. 13b*

650 — (a) ASSIGN A SINGLE RANDOM, 64-BIT MASTER PASSWORD TO THE BATCH.
652 — (b) CREATE ONE UNIQUE ACTIVATION KEY PER COPY OF THE INSTALLED MEDIA MANUFACTURED.
654 — (c) FOR EACH ACTIVATION KEY, CREATE A RANDOM 128-BIT ENCRYPTION KEY.
656 — (d) ENCRYPT A 128-BIT BLOCK, COMPOSED OF THE MASTER PASSWORD PLUS A RANDOM 64-BIT NUMBER, WITH THE ENCRYPTION KEY FOR EACH ACTIVATION KEY.

*Fig. 14a*

| CD # | Activation Key | Encryption Key | Encrypted Key |
|---|---|---|---|
| 1 | $A_1$ | $E_1$ | Encrypt $(E_1,$ Master Key + Random$())$ |
| 2 | $A_2$ | $E_2$ | Encrypt $(E_2,$ Master Key + Random$())$ |
| 3 | $A_3$ | $E_3$ | Encrypt $(E_3,$ Master Key + Random$())$ |
| ⋮ | ⋮ | ⋮ | ⋮ |
| n | $A_n$ | $E_n$ | Encrypt $(E_n,$ Master Key + Random$())$ |

*Fig. 14b*

SYSTEM AND METHOD FOR MONITORING SOFTWARE

CROSS-REFERENCE TO RELATED APPLICATIONS

This application is a continuation-in-part of U.S. application Ser. No. 09/535,321 filed Mar. 27, 2000, now U.S. Pat. No. 6,460,142 which is a continuation of U.S. patent application Ser. No. 09/090,620, filed Jun. 4, 1998, now U.S. Pat. No. 6,044,471, the disclosures of which are hereby incorporated by reference in their entirety. This application also claims priority to U.S. provisional application Serial No. 60/192,284 filed Mar. 27, 2000 titled "System and Method for Monitoring Software," the disclosure of which is hereby incorporated by reference in its entirety.

BACKGROUND OF THE INVENTION

1. Field of the Invention

The present invention relates to systems and methods for monitoring, testing, distribution, and use of computer software with associated methods and systems for repeatedly contacting a software user and exchanging information, such as passwords, authorization information, marketing, advertising, or promotional information, quality assurance information, and network monitoring and metering.

2. Background Art

Software developers are often victims of illicit copying and unauthorized use of their software in violation of contractual obligations imposed by licensing agreements and subject to civil and criminal penalties under various domestic and foreign laws. Unauthorized entities range from a relatively small percentage of the total users to an overwhelming majority of illegal users. Likewise, unauthorized use may range from an "extra" copy on a laptop computer or for an office mate to "try" the software, to understating the number of users for a "site" license or networked version of the software, to wholesale copying and black market selling or distribution of pirated software. Such unauthorized use not only amounts to theft of the developers' intellectual property, but also reduces the number of programs sold and therefore the associated profitability of the developer. This may ultimately diminish the creative effort expended by the software developers due to the reduced financial incentive. The advent of the Internet has contributed to the proliferation of pirated software, known as "warez", which is easily located and readily downloaded.

Various strategies have been employed to make unauthorized duplication and use of software more difficult. One such approach is to provide a hardware "key" which is typically installed in the parallel port of the computer to provide a software interlock. If the key is not in place, the software will not execute. This method is relatively expensive for the developer and cumbersome for the authorized user while remaining vulnerable to theft by duplication of the hardware key.

Another approach requires the user to enter a serial number or customer identification number during installation of the software. Missing or invalid registration information prevents installation of the software. This approach is easily defeated by transferring the serial number or customer identification number to one or more unauthorized users.

Yet another approach requires registering the software with the manufacturer or distributor to obtain an operational code or password necessary for installation of the software. Again, once the operational code or password is obtained, it may be perpetually transferred along with pirated copies to numerous unauthorized users.

Various copy protection strategies have been employed to reduce the number of unauthorized copies available. This approach is generally disfavored by users who may have a legitimate need to make backup or archival copies or transfer a copy to a new computer or hard drive.

In addition to revenue lost due to unauthorized copying of software, developers expend significant resources to research and develop new software features which will be embraced by users. The increasing complexity of software combined with the wide variety of hardware platforms makes it virtually impossible for a developer to test every combination of features for compatibility and proper operation, particularly while subject to market pressures to release new versions of the software on a regular basis. Compatibility issues may arise when a particular application is used with one or more other applications which may be specific to a particular field or discipline. Minor errors or compatibility issues often are not reported by users but contribute to overall dissatisfaction with the product and may result in reduced sales for future versions. Product research relative to the strengths and weaknesses of the software and the desirability of new features is often costly and time consuming which contributes to the market sensitive release of new versions of the software.

While prior art strategies have enjoyed various levels of success in reducing unauthorized use of software, they often impose a significant burden on the authorized users or are easily defeated by unauthorized users. As such, software developers need an apparatus and/or method for reducing unauthorized use of software which does not burden the authorized users to dissuade them from purchasing and using the protected software.

SUMMARY OF THE INVENTION

As such, it is an object of the present invention to provide systems and methods for monitoring, testing, distribution, and use of computer software.

Another object of the present invention is to provide systems and methods for repeatedly contacting a software user and exchanging information, such as passwords, authorization information, marketing, advertising, or promotional information.

A further object of the present invention is to provide systems and methods for monitoring software use to reduce unauthorized software use through repeated contact with users.

Another object of the present invention is to provide systems and methods for monitoring, metering or auditing networked computers having access to particular computer software for compliance with software licensing terms.

Yet another object of the present invention is to provide systems and methods for improving software quality assurance.

A further object of the present invention is to provide systems and methods for collecting operational data relative to various software features which may include program use, errors, help requests, and the like.

In carrying out the above objects and other objects, features, and advantages of the invention, a system and method for generating a plurality of authorization codes for use in monitoring software to reduce unauthorized copying or use of the software include repeatedly requiring a user or user computer to obtain an authorization code upon expiration of an authorization interval for continued operation of the computer software. In one embodiment, the system and method include assigning a unique customer code with a software developer, publisher, or distributor, generating a serial number for each copy of the computer software, generating a password code identifying a plurality of passwords or a password algorithm for each copy of the software, and combining the customer code, the serial number, and the password code to form an authorization code for each copy of the software. In one embodiment, the system and method require a user of the software to contact an authorized software representative during installation of the software, collect registration information from the user or the user computer including an activation key or code, and determine whether the user is an authorized user based on some or all of the registration information and the activation key or code. The codes corresponding to the activation on key or code based on the determination of whether the user is an authorized user.

In another embodiment of the present invention, a system and method for monitoring computer software installed on a plurality of computers in communication with one another or a central computer to form a computer network include associating an activation code or password with the computer software for authorizing one or more copies of the software to be installed on computers associated with the computer network, the activation code or password corresponds to a plurality of authorization codes or passwords (which may be identical if desired), collecting registration information from one or more computers or servers associated with the computer network during installation of the computer software, providing a first authorization code or password from the plurality of authorization codes or passwords for the software to authorize operation of the computer software for a first interval, and requiring entry of another one of the plurality of authorization codes or passwords for each copy of the computer software to continue operating beyond the first interval.

Systems and methods for monitoring computer software to provide quality assurance and marketing information to software developers and/or remote monitoring of network/site license compliance are also provided. In these embodiments, the systems and methods may include storing information relative to use of the computer software and automatically transmitting the stored information to an authorized software representative at predetermined intervals. In one implementation, a system and method for monitoring computer software used by a plurality of computers connected to a local server to form a local area network to reduce unauthorized use of the computer software include monitoring a number of computers using the computer software, storing information associated with the computers using the computer software on the local server, and repeatedly transferring the stored information to a remote server.

The present invention provides a number of advantages relative to prior art systems and methods for monitoring, testing, distribution, and use of computer software. For example, the present invention allows for complete operational and pricing flexibility while providing ongoing contact with authorized users and reducing unauthorized use of software. The global quality assurance capabilities of the present invention afford software developers the ability to fully audit their software applications to identify the strengths, weaknesses, use, and/or errors of various software features. This feature of the present invention may be used for complete statistical control during and after beta test cycles including full monitoring of errors, conflicts, use patterns, etc. eliminating reliance upon human reporting and research. The quality assurance features of the present invention may also be used to provide a complete fault or error log of program conflicts or shutdowns with associated error codes of all programs in use, worldwide, in addition to a complete log of non-fatal errors of all programs in use on a particular computer. Likewise, monitoring of use patterns including time of use, most used features and tools, and use and context of help screens, may be provided through local storage of information which is subsequently transferred to a remote server at predetermined intervals. The flexibility associated with the present invention accommodates a wide range of audit parameters for use in quality assurance as well as network license metering and monitoring. Additional flexibility is provided in that the various features of the present invention may be used alone or in any combination.

The above advantages and other advantages, objects, and features of the present invention, will be readily apparent from the following detailed description of the best mode for carrying out the invention when taken in connection with the accompanying drawings.

BRIEF DESCRIPTION OF THE DRAWINGS

FIGS. 4a and 4b illustrate generation of an activation code and associated password entered by a user for continued operation of protected computer software according to one embodiment of the present invention;

FIGS. 5–7 illustrate messages which provide information to a user of protected software during initial installation or subsequent password updates according to one embodiment of the present invention;

FIGS. 13a and 13b illustrate a representative database for use in facilitating batch and interactive processing of monitoring functions administered by an authorized software representative according to one embodiment of the present invention;

FIGS. 14a and 14b illustrate a system or method for batch distribution of authorization information which may be encrypted according to one embodiment of the present invention;

DETAILED DESCRIPTION OF THE PREFERRED EMBODIMENT(S)

Figure 1A:
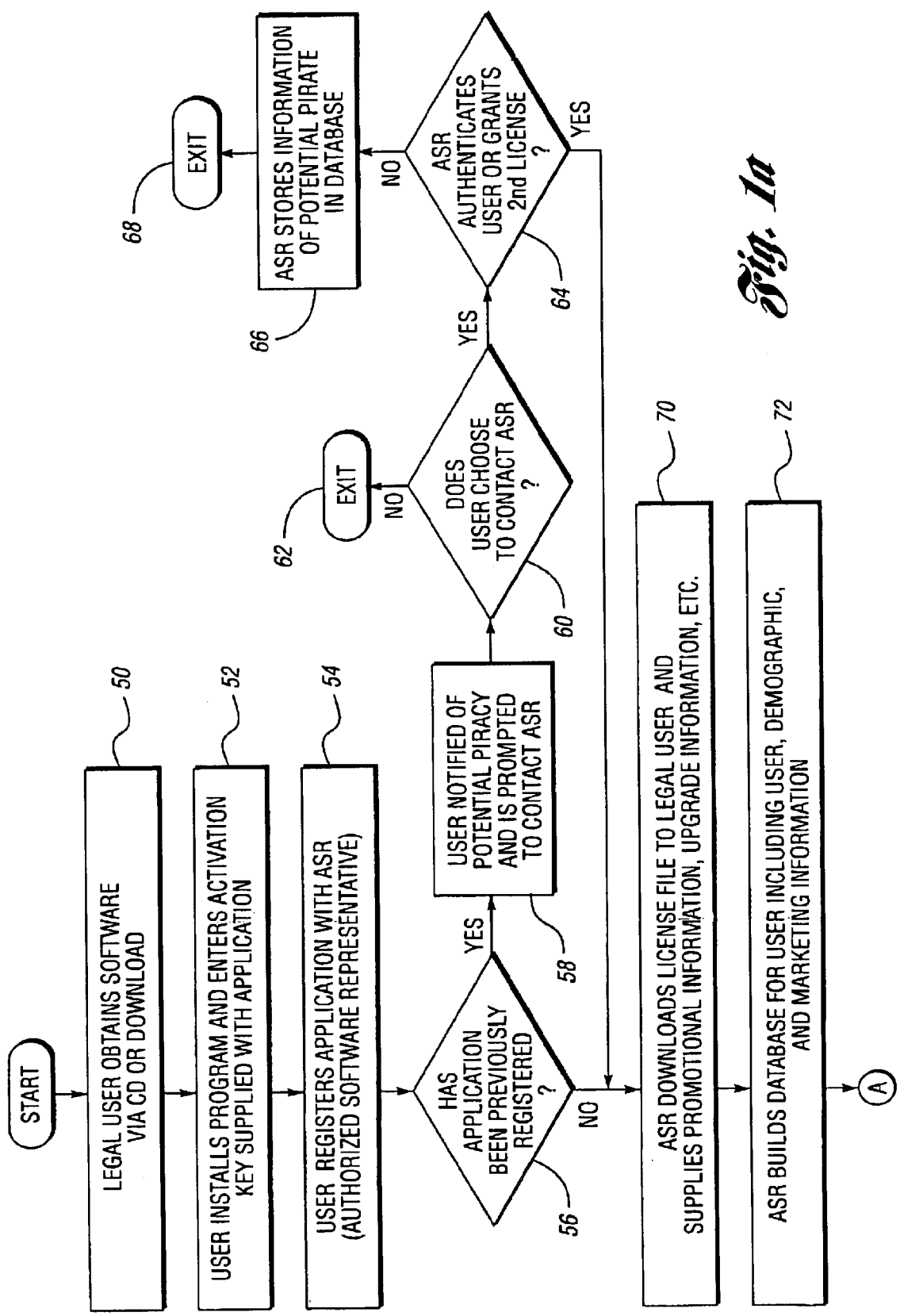
FIGS. 1a and 1b is a block diagram illustrating one embodiment for software monitoring to reduce unauthorized use according to one embodiment of the present invention.

As will be appreciated by one of ordinary skill in the art, the various block diagrams illustrating operation of a system or method for monitoring software according to the present invention may be implemented using one or more general purpose computers, dedicated hardware, or a combination of general and special purpose hardware and software. The various functions or steps illustrated are preferably effected by a programmed computer unless otherwise indicated. Various steps or functions may be performed manually by a software administration or a computer user without departing from the spirit or scope of the present invention. As will also be appreciated by those of skill in the art, the illustrated steps, functions, or control logic may be implemented using any of a number of known programming and processing techniques or strategies and is generally not limited to the order or sequence illustrated. For example, interrupt or event driven processing may be used to capture various information relative to program errors or feature use. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention. Although not explicitly illustrated, various steps or functions may be repeatedly performed depending on the type of function and the type of processing employed.

As described in greater detail below, the present invention provides the capability of integrating various software monitoring features to provide software security, advanced e-commerce marketing and advertising concepts, global quality assurance, and network license auditing, monitoring, and metering. Depending upon the particular application, these features may be used alone or in any combination. Those of ordinary skill in the art will recognize that "passwords" and "authorization codes or keys" may be used interchangeably unless otherwise noted. Similarly, "activation" codes or keys typically represent the first "authorization code" or "password" entered during initial registration of the computer software. As will also be appreciated, authorization "intervals" generally represent a metric for measuring use of a particular software application program. "Intervals" may include but are not limited to random, pseudo-random, regular, irregular, event-triggered, time-based, calendar-based, or other suitable measures for determining use of the monitored computer software. Interval metrics may also include individual or aggregate program execution time or number of program executions, for example.

A security feature according to one embodiment of the present invention should dramatically reduce the piracy rates for software developers including "casual" and low level "institutional" piracy which occurs when users share a favorite application program with a friend or companies understate the number of users for a network version of a software application, whether intentional or not.

The present invention provides a software program module which is easily adaptable and may be easily integrated into software designed for any computing platform and operating system. The process is preferably implemented by embedding a small program within the monitored computer software or application program. During operating, the monitoring module, in this example a security program, authenticates each unique user (or group of users). As such, only authorized users can install or maintain operation of any particular copy of the computer software. This is accomplished through an extensive series of interactive interlocks. If an unauthorized user attempts to copy the software, the software will not operate and the authorized software representative or administrator (which may be the software developer, distributor, publisher, etc.) can track and potentially identify the pirate.

The monitoring module provided by the present invention preferably operates in the background to perform various monitoring functions including but not limited to protecting the application program from unauthorized use while also identifying unauthorized users or user computers. The security feature may be used with various other features for monitoring software according to the present invention to accommodate virtually any potential needs of a wide variety of clients.

One aspect of the security feature according to the present invention is the collection of updated registration information which may include, but is not limited to, extensive marketing and demographic information for each user or group of users. This information may be provided to software developers in a variety of different formats specifically tailored to each developer's need. The repeated contact with authorized users provides extensive marketing opportunities for product upgrades, related products, and the like.

Various pricing models may be provided to generate revenue in accordance with the teachings of the present invention. For example, a security feature may be provided for a nominal charge per authentication code or password update, for example. Alternatively, the service may be paid for by third-party advertising which may be transferred to the user during authentication, for example.

Figure 1B:
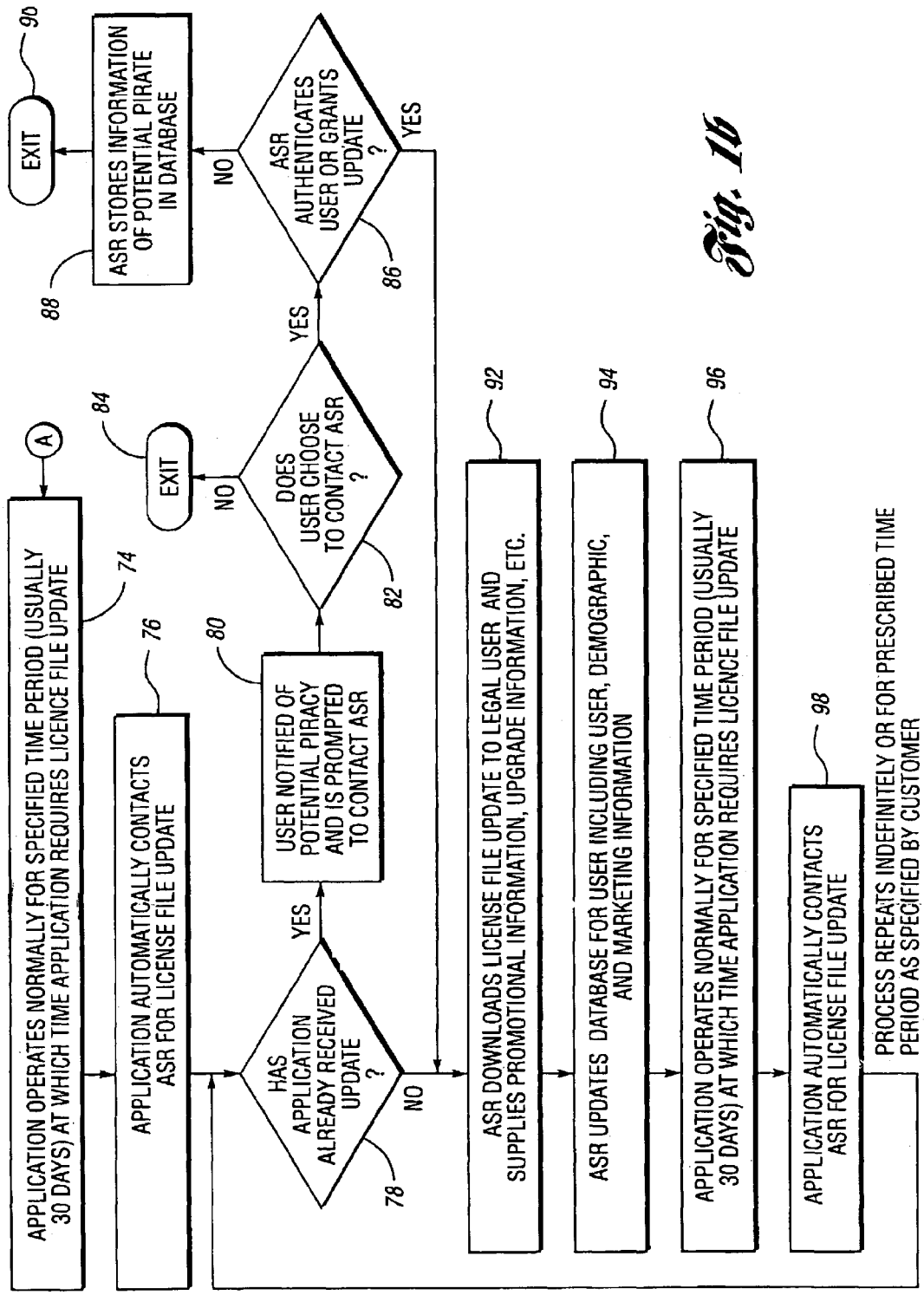

FIGS. 1a and 1b provide a simplified block diagram illustrating a software security feature for a system or method for monitoring software according to one embodiment of the present invention. The process begins with the software developer adding program code to the application program to provide one or more features of the present invention. Whether used alone or in combination with other features, the security feature involves associating a plurality of authorization codes or passwords with a given copy (or group of copies) of the computer software. The plurality of authorization codes may be generated and stored when the computer software is transferred to the distribution media or electronically downloaded but are preferably determined using an appropriate algorithm only when a previous or subsequent code is required. The plurality of passwords or authorization codes may be identified by a unique serial number or password code as illustrated and described in greater detail with reference to FIGS. 3 and 4a and 4b. The application program will then operate for a predetermined authorization period or interval provided the corresponding password has been entered. While manual entry of passwords or authorization information may be accommodated by the present invention, the password is preferably electronically communicated via a network, modem, or other connection, for example.

As illustrated in FIGS. 1a and 1b, a legal or authorized user obtains software via a computer-readable storage medium, such as a CD, DVD, floppy disk, etc., or by downloading the software from an authorized retailer or software representative as indicated generally by reference numeral 50. During installation, the user enters an activation key or the first authorization code which is generally supplied with the application program. Prior to full operation, the user is required to register the software with an authorized software representative which may be the software developer, distributor, or publisher, or a third-party administrator as indicated at block 54. The authorized software representative may provide various functions such as supplying periodic password updates, monitoring use of the software, collecting information relative to quality assurance, auditing compliance with multiple-user licenses, etc.

During registration, the authorized software representative determines whether the particular copy (or group) has been previously registered by comparing registration information corresponding to the activation key with previously entered registration information, if any, as represented by block 56. If the comparison indicates that the user may be an unauthorized user, the user may be notified of a potential licensing violation and is preferably prompted to contact the administrator as represented by block 58. If the user proceeds as represented by block 60, the software representative or administrator may authenticate the user and grant a license by providing an appropriate password from the plurality of passwords associated with the particular copy (or group) of the computer software as represented by block 64. As indicated above, the authorization codes associated with a particular copy or group of copies may be generated as needed by an appropriate algorithm, based on the activation key, for example. Otherwise, the administrator may store various information to identify the potential unauthorized user in a database as represented by block 66. If the user does not proceed with the registration process at block 60, or the registration information indicates that the user is unauthorized as represented by block 64, the process completes as indicated at blocks 62 and 68, respectively. As will be appreciated by those of ordinary skill in the art, various situations may arise where some or all of the registration information for an authorized user may not match previously collected information. The software representative may decide to provide one or more authorization codes based on a partial match or a limited number of requests with completely new registration information. However, embodiments which include prompting the user to contact the software representative and provide information are likely to serve as a deterrent to software pirates.

If no registration information has previously been entered as determined by block 56, the authorized software representative may download a license file to the user as represented by block 70. In addition, various other optional information may be transferred prior to, during, or subsequent to the license file which may include but is not limited to promotional information, marketing information, availability of product upgrades or enhancements, and the like. The administrator preferably also builds a database for each user or group of users including user demographics and marketing information as represented by block 72. Once the authorization information or password has been transferred to the user or software, the application program operates normally for the authorization interval at which time the application program requires a license file update as represented by block 74.

If the monitoring module is active prior to expiration of the current authorization interval, the security feature attempts to automatically contact the authorized software representative for a license file update as represented by block 76. In the event that the monitoring module is not active, or is unable to contact the authorized software representative, the security feature may attempt to contact the authorized software representative after expiration of the authorization interval as well. Preferably, the security feature determines an acceptable time to contact the administrator based on the program or computer use. This determination may be made automatically or by prompting the user during registration or through a utility to identify the best time to obtain updates. For example, the security feature may determine to contact the administrator based on time of day, i.e. late-night operation, status of processor utilization, i.e. computer is idle, when a dial-up connection to the Internet is active, during the next execution of the application program, and the like. Preferably, once the user completes the registration process, the license file remains in place whether or not the application program has been uninstalled. This feature allows for reinstallation of the software without re-registration or requiring an authorization code update. This feature is particularly suited for group or network license applications.

Block 78 represents a determination based on the activation key and/or password code of whether the particular copy of the computer software has already received an update. If an update has been previously received for this copy of the computer software, the user is notified of a potential licensing violation and is prompted to contact the authorized software representative as represented by block 80. If the user chooses to proceed with contacting the authorized software representative as represented by block 82, the authorized representative may obtain additional registration information to authenticate the user and/or decide whether to grant an update as represented by block 86. Otherwise, the process terminates as indicated at block 84. Whether or not the representative decides to issue an updated password or authorization code associated with the computer software, the administrator may store information related to the potential license violation as represented by block 88 prior to terminating the process as indicated at block 90.

If the application has not received an update as determined by block 78, or the authorized representative determines that a password update is appropriate as represented by block 86, an updated license file may be downloaded to the authorized user (user computer, group, or server, for example) while optionally providing additional information which may include but is not limited to promotional information, upgrade information, and the like as represented by block 92. The administrator's database is then updated to include user information, demographic, and marketing information as represented by block 94. The computer software or application program then operates normally for the next authorization interval before another license file update is required as represented by block 96. In this example, the specified authorization interval is based on a calendar or date and corresponds to 30 days. Various types of authorization intervals may be provided depending upon the particular application as noted above. For example, authorization intervals or time periods may be based on accumulated execution time of one or more copies of the computer software. For multiple-license applications, the authorized interval may be based on an aggregate total execution time for all users at a particular site or on a particular network, for example. Similarly, authorization intervals may be based on the relative value of the computer software being protected by the security feature according to the present invention. For example, more expensive or costly computer software may have a shorter authorization interval to further discourage unauthorized use. The authorization interval may increase as the product ages and new releases are available if desired.

The security feature automatically contacts the authorized representative for a license file update as represented by block 98 of FIG. 1b. Preferably, the application begins to attempt to contact the authorized administrator prior to expiration of the current authorization interval. For example, 15 days before expiration of the current interval, the program may attempt to automatically contact the authorized representative for a license file update. If the attempt is unsuccessful, repeated attempts may be made with increasing frequency to improve the probability of a successful update without user intervention. Alternatively, or in combination, the user may be prompted upon the next execution of the program to contact the authorized software representative for an update. The update may proceed automatically or manually from this point.

Each time a user contacts the authorized software representative, the representative can compile updated registration information which may include name, address, computer processor identification, email address, etc. In addition, demographic and marketing information may be gathered depending upon the particular computer software and target market.

The process illustrated in FIGS. 1a and 1b may be indefinitely repeated to provide continued contact with users. Alternatively, a master password may be transferred to the user or computer software to provide an indefinite authorization interval, i.e. an authorization interval which does not require any further password or license file updates. Furthermore, a password may be downloaded to disable any further operation of the software if the user is determined to be an unauthorized user.

Figure 2:
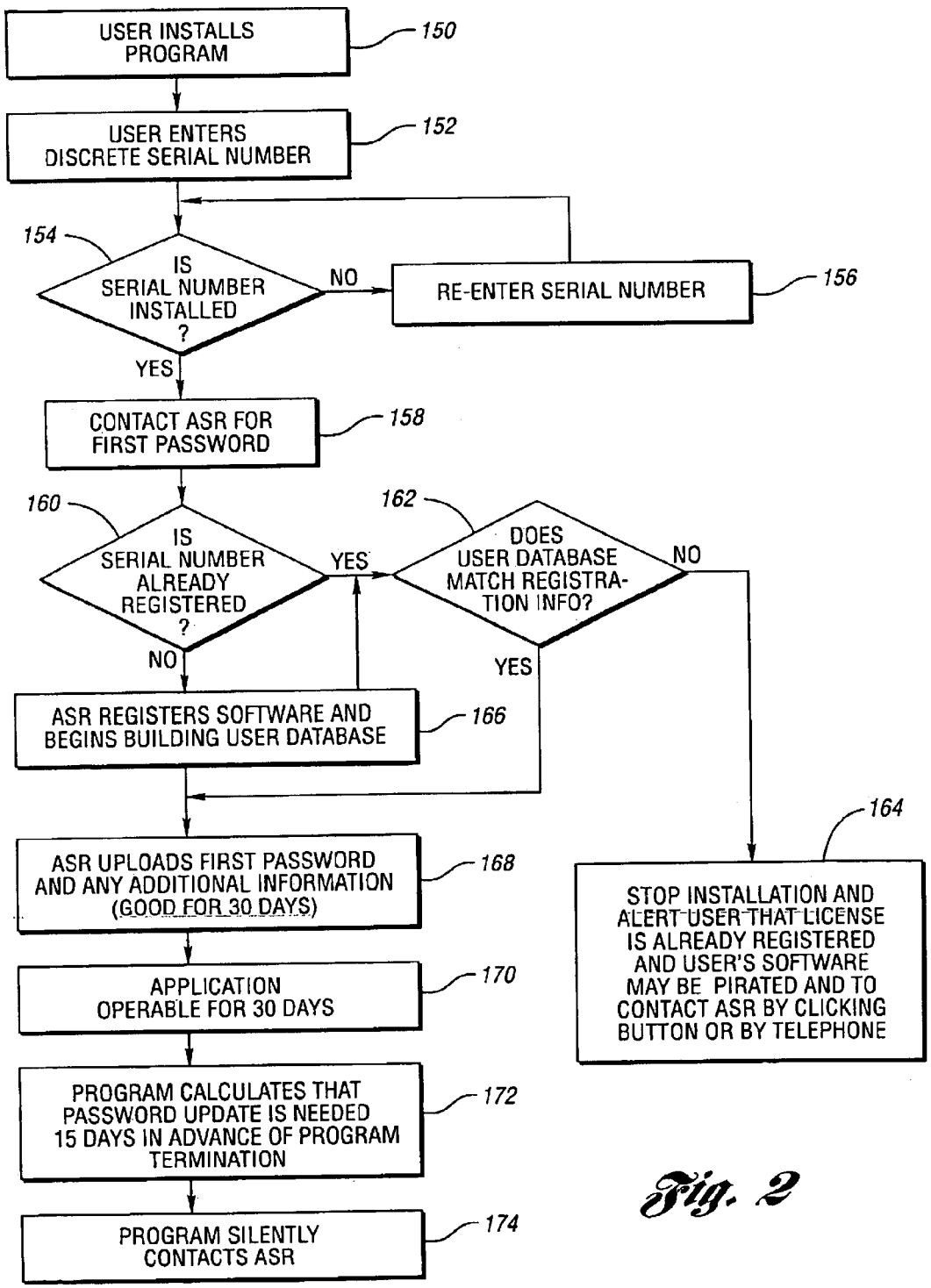
FIG. 2 is a block diagram illustrating one embodiment for initial installation of computer software for a system or method for monitoring software according to the present invention

A block diagram illustrating an alternative representation of a system or method for monitoring software using a security feature during initial setup and installation according to one embodiment of the present invention is shown in FIG. 2. As represented by block 150, a security feature is activated when the user installs the application program. During the installation, the user is required to enter a serial number or activation key which has been previously associated with a particular copy or group of copies of the software. Serial numbers can be supplied with the software packaging or documentation, can be hard coded on the distribution medium, or can be generated during the registration process or electronic software distribution process. For software which is downloaded over a communication network such as the Internet, the serial numbers can be coded and stored within a database which supplies the serial number at the time of download, or can be generated via an appropriate algorithm as part of the registration process. Alternatively, the security feature of the present invention may function without the use of serial numbers with the authorized users contacting an authorized software administrator to obtain subsequent passwords from a list of passwords upon expiration of each authorization interval. However, the list of passwords or algorithms used to generate the passwords may not be unique to a particular program. In this embodiment, password sequencing could be used to discourage unauthorized copying by requiring that each password or authorization code be entered in the appropriate sequence for the computer software to function. Authorization code sequencing may be implemented by generating an authorization code using a previous or preceding authorization code.

As described above, software may be identified in batches with the same or similar serial numbers as opposed to having unique serial numbers for each copy of the software. Passwords or authorization codes may then be keyed to a group of software copies. Likewise, various distribution media, such as CD-ROMs, DVDs or electronic software distribution may be identified by a particular batch with the CDs or downloaded programs coded electronically or physically to identify their batch.

Block 154 of FIG. 2 determines whether a valid serial number has been entered. Block 156 provides additional opportunities to enter a valid serial number before the registration process continues. Once a valid serial number has been entered as determined by block 154, the security feature contacts a third party or other authorized software representative to obtain a password to authorize the software for an authorization interval as represented by block 158. A database, preferably stored on a remote server administered by the authorized software representative, is queried to determine whether the serial number has already been registered as represented by block 160. If the serial number has been previously registered, block 162 determines whether the registration information indicates that the user is an authorized user. If not, the installation process is terminated with an appropriate message provided to the user that the license has already been registered and this particular copy of the software is unauthorized as represented by block 164. A message may also be provided indicating that the user must provide additional registration information to proceed if the user believes that he is an authorized user. Alternatively, or in combination, additional information may be automatically gathered via the network address, processor ID, and the like to track unauthorized users and take additional action.

If the software has not yet been registered, the authorized representative collects the registration information and begins building a user database as indicated by block 166. The user database may include various information related to the user and/or user computer. The software representative then determines an appropriate password from a plurality of passwords associated with the software to the user computer and/or manually transfers the information to the user for entry into the computer software. Any additional information may also be provided which may include but is not limited to advertising, promotional, or other information displayed on the user computer as represented by block 168.

The present invention contemplates a variety of passwords which may be used individually or in a particular sequence. For example, passwords may be generated for a given serial number with any one of the passwords being acceptable to authorize continued use independent of the particular sequence in which the passwords are entered. Alternatively, passwords may be required to be entered in the specified sequence to allow operation of the computer software. In this embodiment, the passwords would be either generated in advance and stored in a database or preferably generated by an associated algorithm at the time of the update. Interlocked passwords may also be used to further enhance the security feature of the present invention. For example, passwords may be interlocked to particular hardware information such as the operating system serial number or version code, machine identifiers, and the like. Passwords or authorization codes are then generated based on a combination of the serial number and machine identifiers as illustrated and described in greater detail with reference to FIGS. 3 and 4a and 4b.

As described above, passwords may be unique to each copy of the computer software as identified by the activation key and/or serial number contained within the activation key. Similarly, passwords may be unique to a particular machine based on a machine identifier or a combination of the machine identifier and software serial number. One list of passwords may also work for a group of software. Master passwords may be supplied to authorize the software indefinitely such that feature updates are no longer required. Likewise, a master password may be provided to disable operation of the software.

After an appropriate authorization code has been obtained from the administrator as represented by block 168, the application program operates normally for a predetermined authorization interval, such as 30 days in this example, as represented by block 170. The security feature then monitors the authorization interval to attempt to contact the authorized representative prior to expiration of the interval as represented by blocks 172 and 174. As described above, the security may continue to attempt to contact the authorized representative after expiration of the authorization interval until a successful update has been completed.

Figure 3:
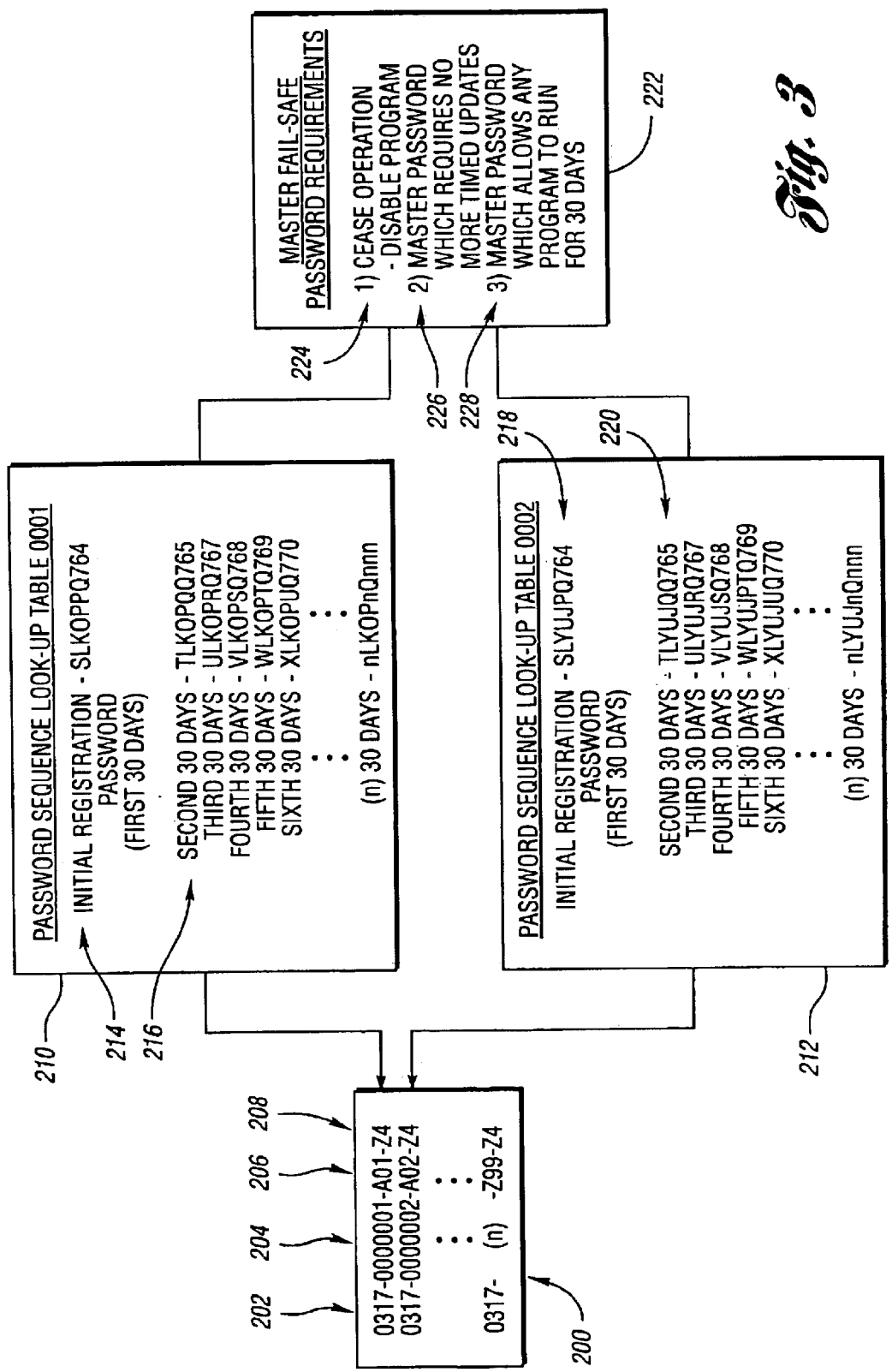
FIG. 3 illustrates an authorization or activation code and related password sequence tables according to one embodiment for monitoring software of the present invention.

FIG. 3 illustrates an authorization or activation code or key and related password sequence tables for use in a system or method for monitoring software according to one embodiment of the present invention. Activation keys indicated generally by reference numeral 200 are each associated with one or more copies of the computer software. Each activation key 200 preferably includes various components or sub-keys which may vary depending upon the particular application. In the embodiment illustrated in FIG. 3, each activation key 200 includes an embedded customer code or ID 202, serial number 204, and password code 206. Customer code 202 preferably corresponds to a particular software developer or client of the authorized software representative. Serial number 204 may be a numeric or alphanumeric sequence generated by the software developer or publisher and printed on the packaging when appropriate. For computer software purchased on-line, the serial number may be displayed to the user on the user's computer as described in greater detail below. Password code or sequence 206 preferably identifies a plurality of passwords and/or an associated password generating algorithm which generates authorization codes associated with corresponding authorization intervals. Password or authorization codes 206 may also identify the particular authorized software representative or administrator as represented by reference numeral 208, if desired.

As described above, the computer software requires entry of an activation key 200 which is then parsed to identify the serial number 204 and password code 206. The computer software preferably will not execute without entry of a valid key. In addition to the activation key, an appropriate password obtained from the authorized software representative for the corresponding activation key must also be provided. As such, entry of a serial number or activation key only allows the user to continue the installation process and obtain a password. Passwords are preferably associated with specific activation keys and do not enable operation of the computer software unless the password corresponds to the activation key.

As also illustrated in FIG. 3, each password code preferably corresponds to a password sequence lookup table 210 212. Of course, the lookup tables illustrated in FIG. 3 are simplistic examples shown to illustrate the basic principles of one feature for monitoring software according to the present invention. Any of a number of commercially available algorithms may be used to generate pseudo-random serial numbers and passwords which are more difficult to guess or hack. Password sequence lookup table 210 corresponds to a first password code and includes an initial registration password 214 in addition to subsequent passwords 216 corresponding to subsequent authorization intervals. In the illustrated example, each authorization interval is based upon a regular or consistent calendar interval of 30 days. Varied intervals based on other criteria may be provided as described above.

Similarly, password sequence lookup table 212 includes an initial registration password 218 and related passwords 220 associated with subsequent authorization intervals. A master password table 222 may also be provided to track master passwords to disable operation of the application program as represented by reference numeral 224. In addition, a master password which provides an indefinite authorization interval 226 may also be associated with one or more password codes 206. Likewise, a master password which allows any program (i.e. not necessarily associated with a particular authorization code or algorithm) to run for a particular authorization interval may be provided as represented by block 228.

FIGS. 4a and 4b illustrate generation of an interlocked password and authorization code for use in monitoring computer software according to one embodiment of the present invention. The computer software generates a registration code 250 which includes various components or subcodes indicated generally by reference numerals 252–266. In the embodiment illustrated in FIGS. 4a and 4b, the components of the registration code 250 include an update number 252 corresponding to the particular authorization interval and various machine identifiers intended to be specific of a particular user computer. For example, a hard drive code 254, RAM code 256, processor or type 258, and manufacturer code 260 may be used to uniquely identify a user computer or authorized server in a local area network (LAN) application. Time zone 262, biweekly date 264, and time of installation 266 are determined during the initial registration process and used during subsequent authorizations to make it more difficult to guess or determine the registration code 250. As illustrated, registration code 250 is preferably encoded using alphanumeric characters which are not easily discernible as to their meaning by a user. To generate a particular authorization code, the registration code 250 is used to generate a portion of authorization code 274 via a table 268 which is preferably stored on a server administered by an authorized so ware representative. Table 268 includes alphanumeric characters corresponding to the registration code 250 as represented generally by reference numeral 270. Corresponding alphanumeric characters 272 are used to generate a portion of an authorization code 274 in addition to a password selected from a plurality of passwords associated with a particular password code as represented by reference numeral 276. In the example illustrated in FIGS. 4a and 4b, a simplified letter exchange represented by table 268 is performed with each profile using a different exchange key. The exchange key may be generated by an algorithm based on a serial number associated with the computer software. Preferably, each code is supplied in the form of a plug-in module. Some codes may not be used in the automatic electronic update process but only in the manual password entry mode according to the present invention. This allow the monitor module to display the generated code which can be manually provided to an authorized software representative to obtain an authorization code for those users/computers unable or unwilling to electronically transfer authorization information as described in greater detail below.

To obtain a password update, registration code 250 is transferred to the authorized software representative (manually or automatically). The corresponding decoding table 268 is accessed to provide corresponding codes 252'–266'. In addition, one of the plurality of passwords associated with the password code is selected and supplied to the user or user computer as indicated generally by reference numeral 276. For continued authorization and operation of the protected software, the registration code and corresponding codes for the hardware, time, date, update number, etc. must match in addition to the balance of the password based on the serial number and other registration information stored in the database maintained by the authorized software representative.

As an example, a user attempting to obtain the third password update has a user computer with a 22 G hard drive, 256M RAM, Intel Pantium III 600 MHz processor, registered in the central time zone, and is updating the length biweekly period of the year at 4:00 p.m. The computer software generates a corresponding alphanumeric code such as: "JBLSQBCA".

Upon contacting the authorized software representative, the representative obtains the code generated by the software indicated above. The server software generates an appropriate corresponding code based on the coding key table and selects or generates another password from the plurality of passwords corresponding to the password code for the particular copy of the computer software. The authorization code is provided to the user or user computer to authorize continued use of the software for a subsequent authorization interval.

If the software was copied and installed on another computer, it would not operate since the authorization code provided by the administrator would not match the hardware-specific codes generated by the software. As an example, an unauthorized user attempting to obtain a password for the computer software described above has a 26 G hard drive, 128M RAM, Intel Pantium III 500 MHz processor and is registering from the Pacific time zone at 8:00 a.m. to obtain the third biweekly update. The software would generate a different alphanumeric code based on this information, such as: "TXRJOPES." Upon supplying this code to the authorized software representative, the returned code would correspond to: "PWSLJWEQ" which would not enable operation of the computer software. Coupled with serial number identification and other user information, this feature of the present invention should significantly decrease the probability of successful piracy.

Figure 6:
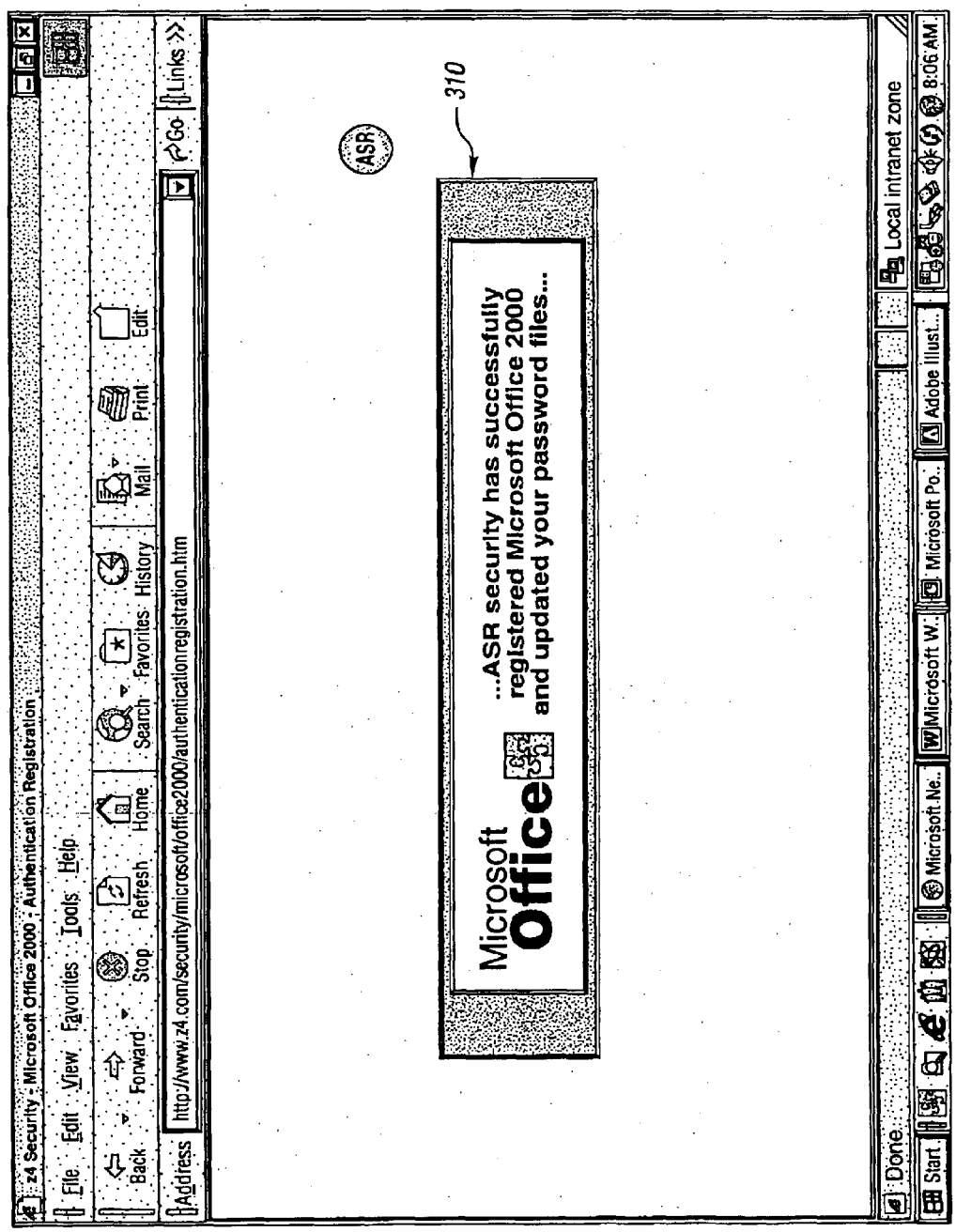
Figure 7:
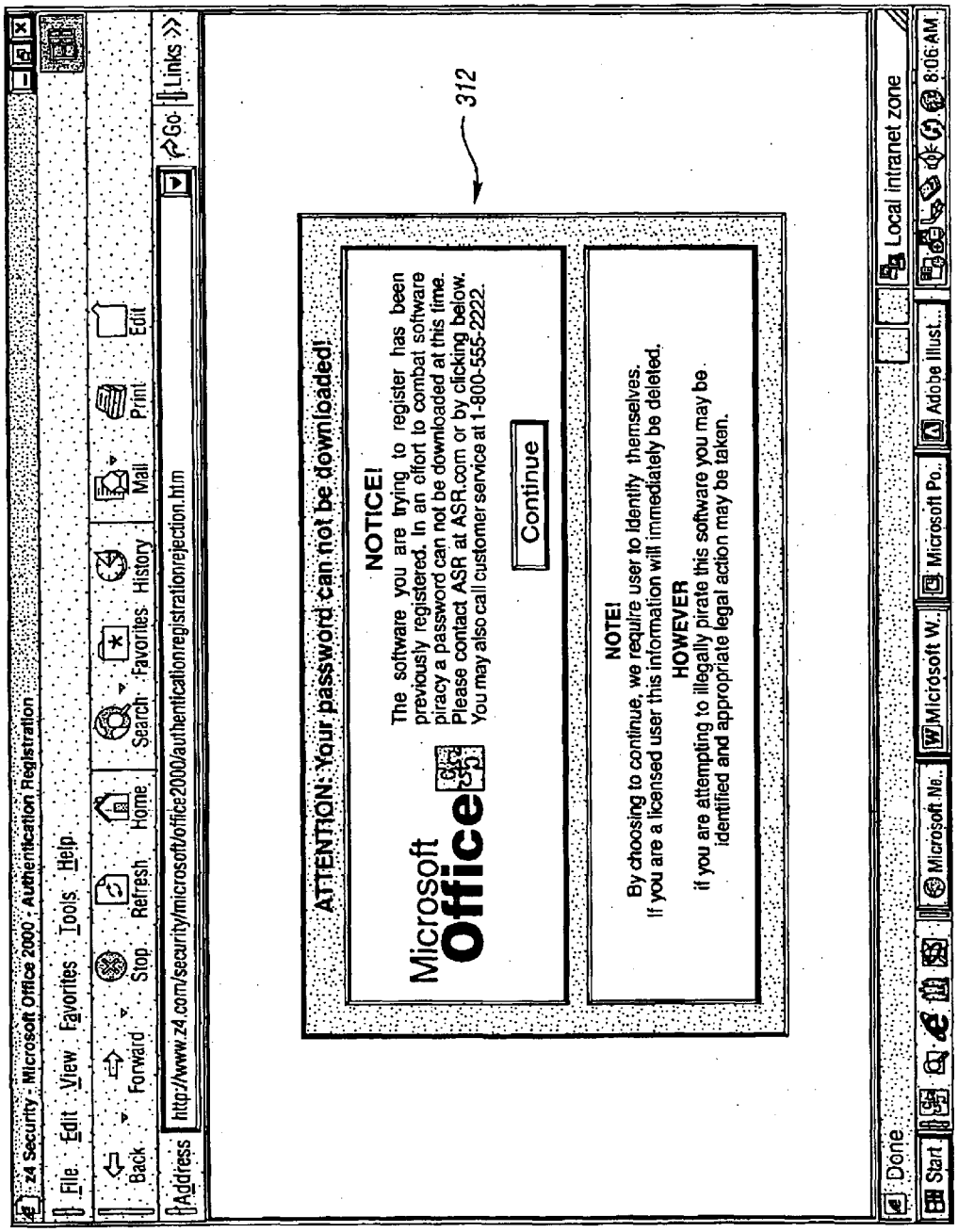

FIGS. 5–7 illustrate representative messages which provide information to a user of protected software during initial installation or subsequent password updates according to one embodiment of the present invention. As illustrated in FIG. 5, during installation of protected software, the user may be prompted or notified that registration is required prior to using the software by an appropriate message utilizing text and/or graphics as represented generally by reference numeral 300. Message 300 may identify the software as indicated at 302 and/or the authorized software representative as indicated at 304, if desired. During this phase, the user may select a default method for obtaining subsequent authorizations corresponding to automatic or manual registration. Automatic registration may be completed in the background, without prompting the user, as described above. Manual registration may require the user to connect to a network, connect via modem, or speak with an authorized representative via telephone, for example.

FIG. 6 illustrates display of transferred information, such as message 310, which indicates that the authorized software representative has transferred the appropriate authorization code or password files to allow continued operation of the computer software. If registration information transferred to the authorized software representative indicates that the user may be unauthorized, an appropriate message 312 (FIG. 7) may be displayed on the user computer. As illustrated, the user may be prompted to contact the software representative by telephone or otherwise to update the registration information and/or obtain appropriate authorization codes. It should be recognized that some discrepancies between registration information may be tolerated while continuing to provide subsequent authorization for continued use of the computer software. For example, the authorized software representative may elect to provide subsequent authorization codes for partial matches of previous registration information to accommodate installation on multiple computers by a single registered user such as a desktop, laptop, home computer, and the like.

Figure 8:
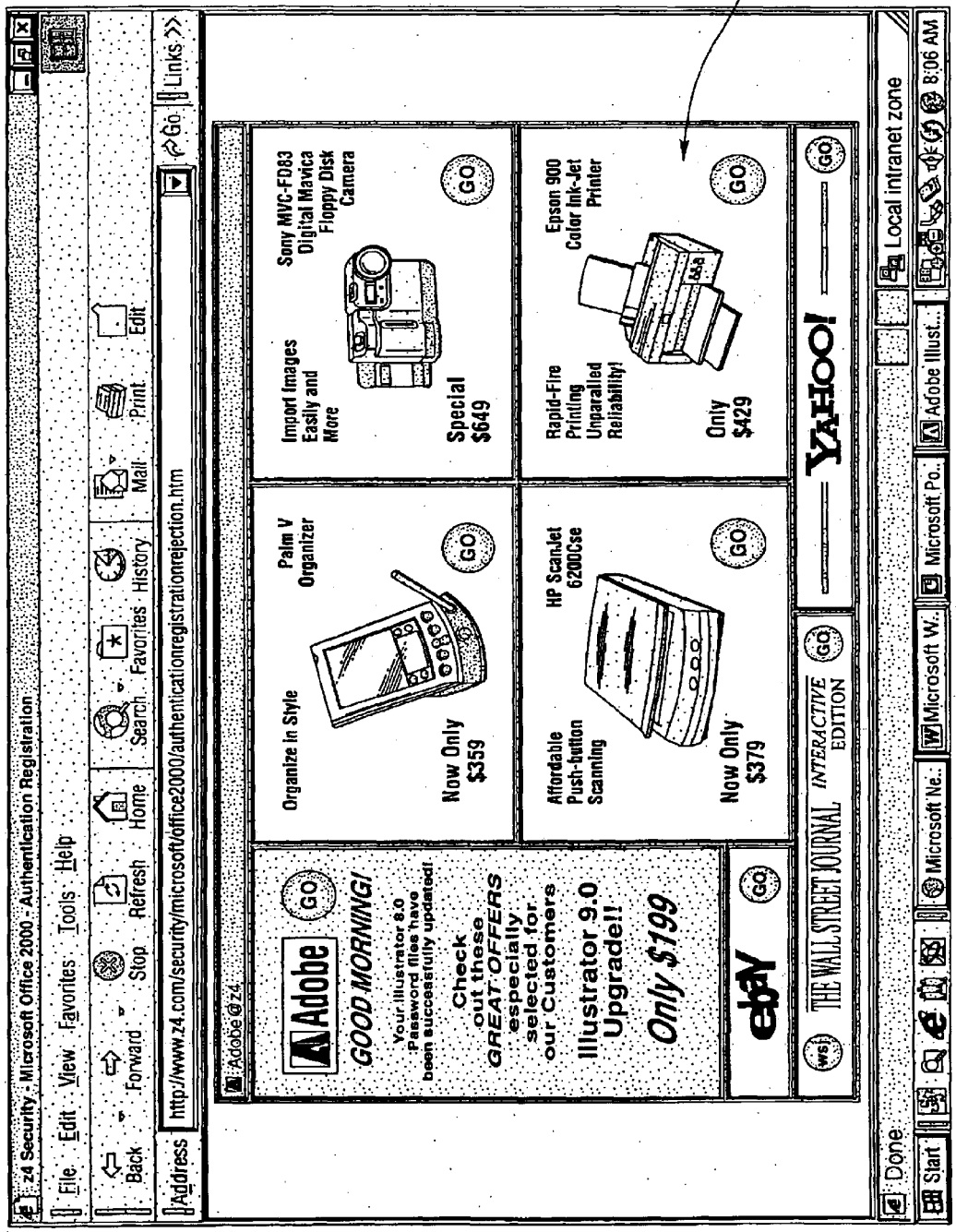
FIG. 8 illustrates representative information including but not limited to advertising, marketing, or promotional information which may be transferred during initial installation or a subsequent password updates according to one embodiment of the present invention.

FIG. 8 illustrates representative information which may be transferred to the user or user computer during initial or subsequent password updates according to one embodiment of the present invention. Information, indicated generally by reference numeral 320, may include but is not limited to various marketing, promotional, and advertising literature based in whole or in part upon the registration information entered by the user. Preferably, advertisements are targeted to the user based on demographic information entered during registration. As illustrated in FIG. 8, information 320 may include a plurality of frames, each having associated multi-media capabilities including text, graphics, and sound if desired.

Figure 9:
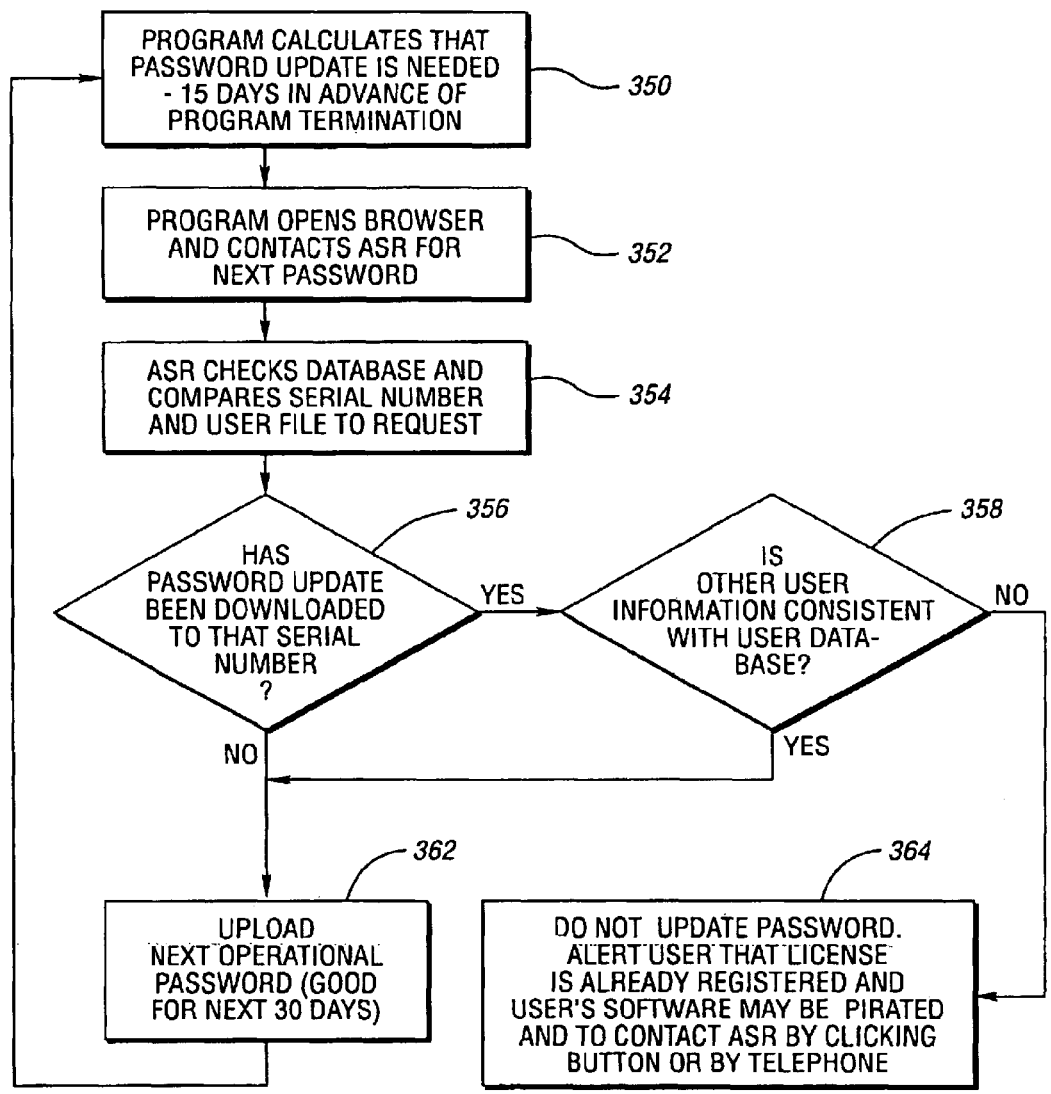
FIG. 9 is a block diagram illustrating operation of a system or method for monitoring software including a license file or password update process according to one embodiment of the present invention.

FIG. 9 is a block diagram illustrating operation of a system or method for monitoring software including a password update process according to one embodiment of the present invention. In one preferred embodiment, the computer software includes an integrated monitor module which implements one or more features of the present invention. For example, the monitor module may implement the security feature by controlling access to licensed programs. To implement the quality assurance features of the present invention, the monitor module records various program events on a local computer or server and periodically transmits information related to the events to a remote computer or server as explained in greater detail below. For network license auditing, monitoring, and metering, the monitor module gathers various information relative to use of the monitored computer software and repeatedly transfers information to a remote server. For the security feature illustrated in FIG. 9, block 350 may include a license module which determines whether the licensed program will run based on the current license file which is preferably encrypted. The license module preferably determines when the current authorization interval will expire and begins attempting to renew the license file or password prior to expiration as represented by block 350.

In the embodiment illustrated in FIG. 9, the license module then opens a default browser such as Microsoft Internet Explorer or Netscape Navigator and contacts an authorized software representative to obtain an additional password as represented by block 352. An appropriate web server may then be used to administer the update process as illustrated and described with reference to FIG. 15, for example. The browser should remain open throughout the password update process and will preferably be automatically closed by the license module when the process has been completed.

The license module may reside on each computer or may be centrally located on a server with user computers connected to the server to form a computer network. In this implementation, the present invention is capable of providing comprehensive network license monitoring which extends beyond simple license metering to provide full anti-piracy coupled with client/customer interactivity. The license module is capable of monitoring and auditing all network licenses in any manner chosen by the software developer while offering licensing program flexibility to gain increased market share. A wide range of network auditing, monitoring and metering parameters provides software developers with the ability to maintain absolute accurate license compliance in virtually any format. In addition, the interactivity of the process affords the developers the ability to maintain ongoing direct contact with current licensees while providing marketing opportunities with potential licensees.

With continuing reference to FIG. 9, after opening the default browser, the licensing module attempts to contact the authorized software representative to obtain a password. This step may be completed during an idle time or non-peak hours based on a particular user's selection or may be determined automatically by the license module. The password administrator parses the authorization code or activation key provided by the user or user computer to select an appropriate password file or table and to select one of the plurality of passwords for a subsequent authorization interval as represented by block 354.

Block 356 determines whether the requested password update has previously been downloaded for that particular copy of the computer software. If so, the registration information and/or authorization code is compared with previously gathered information as represented by block 358 to determine whether the user is an authorized user. If it appears the user is not authorized, various information may be transferred to the user computer indicating that a licensing violation may have occurred as represented by block 360. Otherwise, an appropriate authorization code is selected or generated corresponding to the activation key and transferred to the user computer to authorize operation for another interval as represented by block 362.

Figure 10:
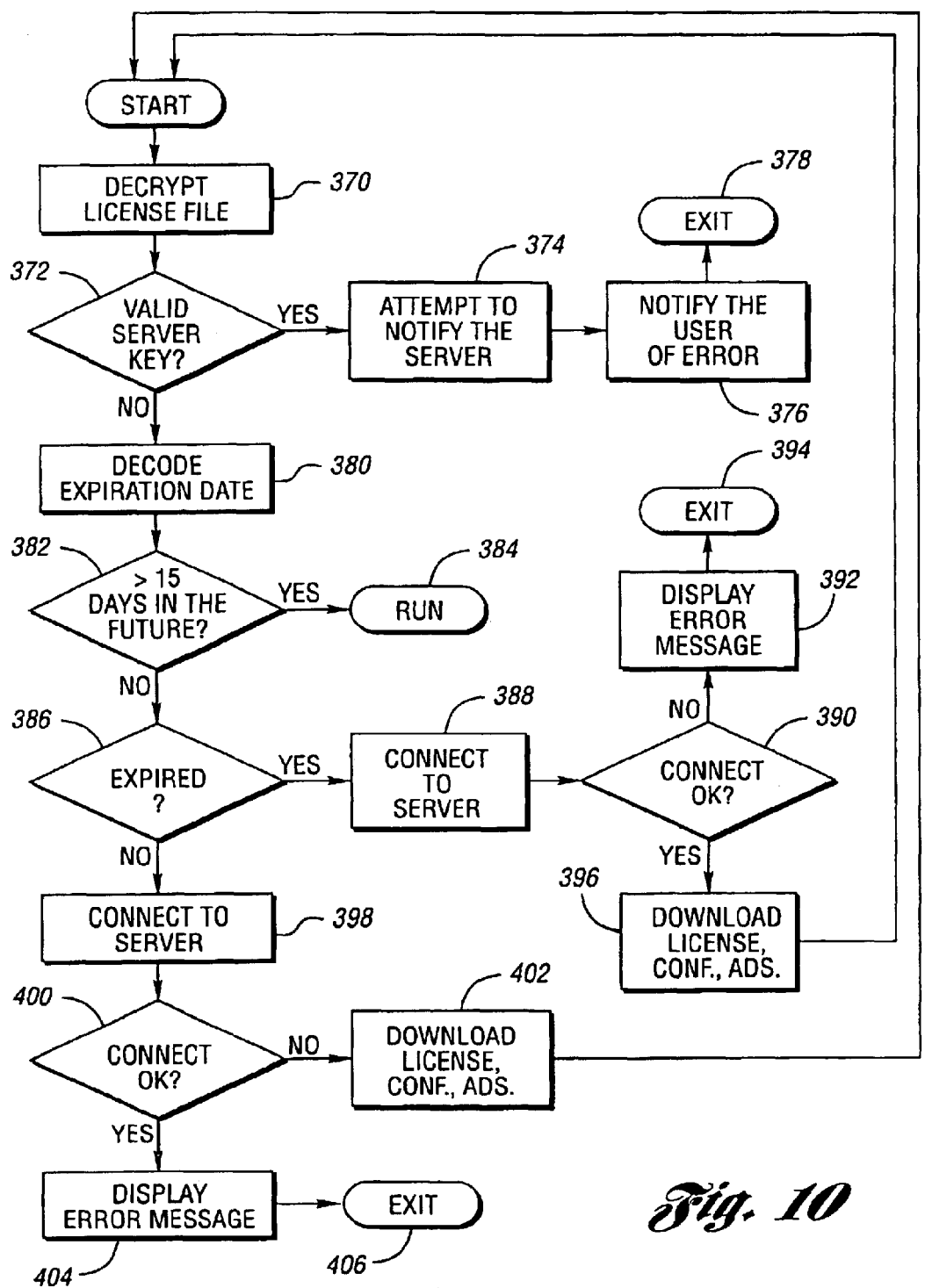
FIG. 10 is a block diagram illustrating operation of a system or method for automatically renewing or updating a password according to one embodiment of the present invention.

FIG. 10 is a more detailed block diagram illustrating operation of a license module in a system or method for monitoring software according to one embodiment of the present invention. FIG. 10 illustrates an automatic electronic license renewal process which may be used by the security feature of the present invention. Whenever the computer software executes, the license module will open a license file and attempt to decrypt the file with a public key as represented by block 370. The public key is preferably stored within the executable code of the licensing module. If the license file is correctly decrypted, expiration information for the current authorization interval can be extracted from the license file and the program will execute normally. If there is an error decrypting the license file as determined by block 372, an attempt to notify the server associated with the authorized software representative is made as represented by bock 374. The user is then notified as indicated by block 376 and the process terminates as represented by block 378.

If the expiration information for the current authorization interval is properly decoded as represented by block 380, block 382 determines whether the expiration is approaching. In this example, the authorization interval corresponds to 30 days. The licensing module begins attempting to contact the authorized software representative 15 days prior to the expiration of the authorization interval as represented by block 382. Otherwise, the program executes normally as represented by block 384.

If the current authorization interval has expired as indicated at 386, an attempt is made to connect to the server of the administrator as indicated at 388. If the connection is successful as determined by block 390, information including a licensed file update with a new authorization interval and/or various other information may be downloaded to the user or user computer as indicated at 396. Otherwise, an error message is displayed as indicated at 392 and the process terminates as represented by block 394.

If the current authorization interval has not expired as determined by block 386, an attempt is made to connect to the server of the authorized representative as indicated at 398. If the connection is successful as represented by block 400, the subsequent password or license file is downloaded along with optional additional information as represented by block 402. Otherwise, an inner message is displayed as indicated at 404 and the process terminates as indicated at 406.

As described above, second or repeated attempts to download a particular license file may indicate an illegal user. The password or license file administrator preferably compiles any available information concerning such potential illegal users. Because the software is activated and associated with a specific, known user, all copies (legal or illegal) will also be associated with that user. This should provide an additional deterrent to users from distributing copies of the software because all copies will indicate the user who originally licensed them (and therefore the first illegal user in the distribution chain). Users cannot remove the identifying information without also disabling the software.

Figure 11:
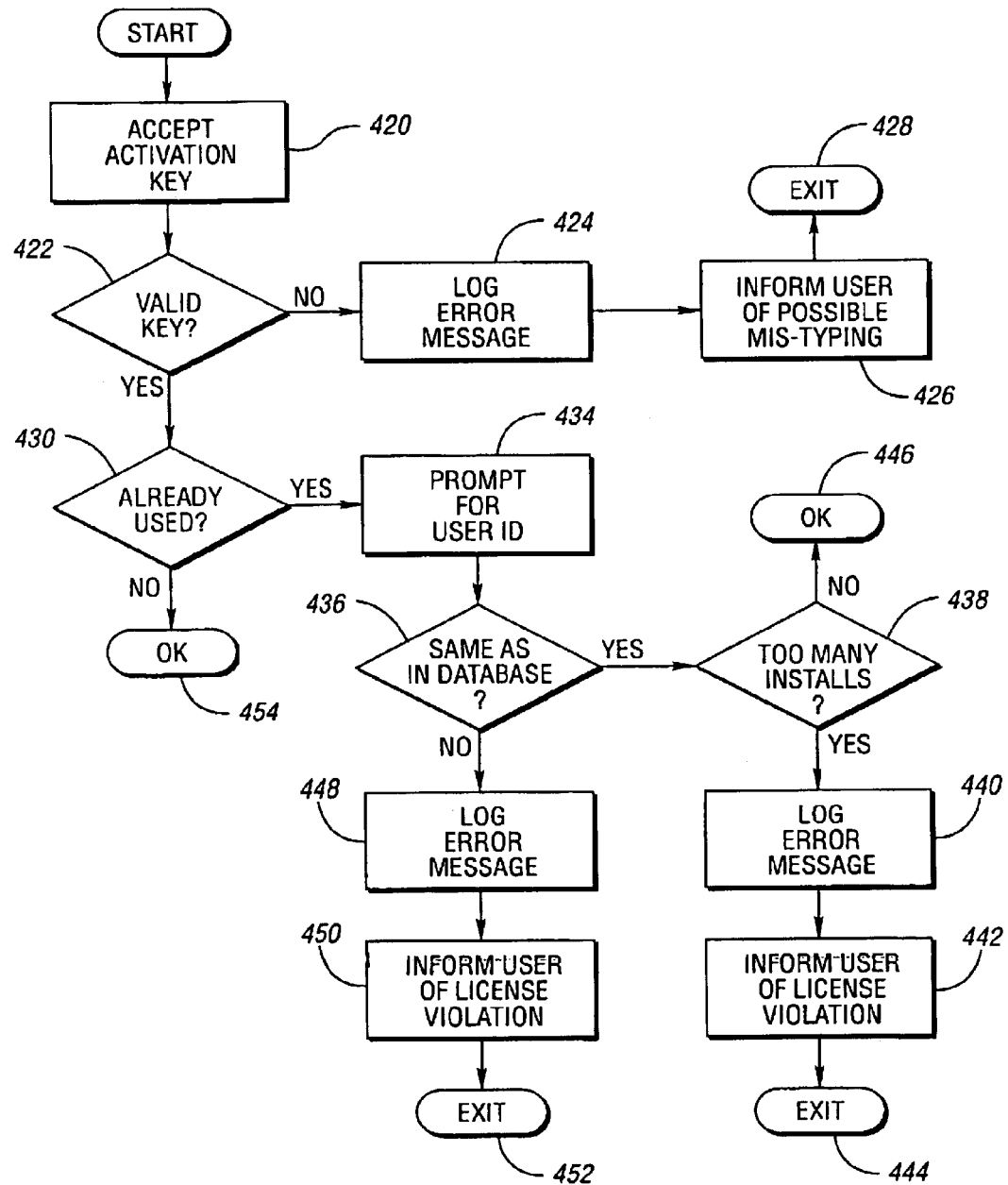
FIG. 11 is a block diagram illustrating operation of a system or method for server registration and validation of an activation key according to one embodiment of the present invention.

FIG. 11 is a block diagram illustrating operation of a system or method for server registration and validation of an activation key according to one embodiment of the present invention. The server is preferably managed by the authorized software representative which provides remote monitoring of network license compliance, password administration, and/or quality assurance metrics according to the present invention. Block 420 receives the activation key associated with a particular copy (or group) of computer software. Block 422 determines whether the activation key is valid. If the activation key is not valid, block 424 collects any available information relative to the user and/or user computer along with an associated error message. Block 426 informs the user of a possible typing error and the process exits as indicated at 428. If a valid activation key is transferred to the server, block 430 determines whether the activation key has already been used.

If a valid activation key has already been used, block 434 obtains additional information from the user which is then compared to the previously obtained information as indicated at 436. Block 438 determines whether the user has attempted to install the software more than the authorized number of times. If too many installations are indicated, relevant information is logged as represented by block 440. The user is then informed of a licensing violation as indicated at 442 and the process terminates as indicated at 444.

As described above, various software developers may allow a particular user to install more than one copy of a particular application program. As such, block 438 may be limited to a single installation or alternatively multiple installations depending upon the particular application. If the user is within the allowable number of installations, the process terminates as indicated at 446.

If the user information does not match the information previously stored in the database as indicated at 436, an appropriate error message is logged at 448 and the user is notified of the license violation at 450 with the process terminating at 452.

If a valid activation key has not already been used, the key is authenticated and the process terminates as indicated at 454.

Figure 12:
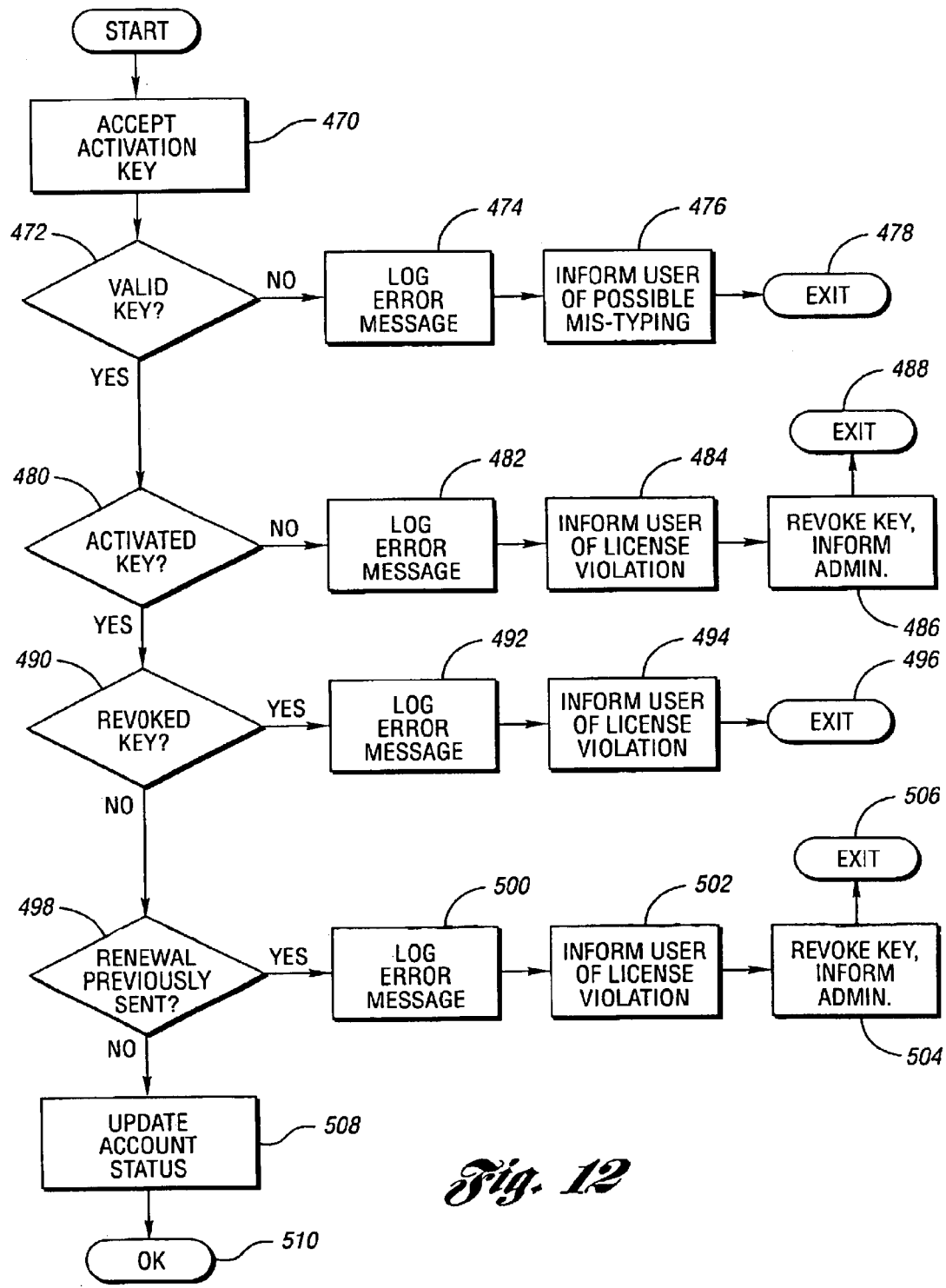
FIG. 12 is a block diagram illustrating operation of a system or method for server license file renewal according to one embodiment of the present invention.

FIG. 12 provides a block diagram illustrating a server process for license file renewal for one embodiment of a system or method for monitoring software according to the present invention. Block 470 accepts an activation key from the user or user computer. Block 472 determines whether the activation key is valid using any of a number of known algorithms for generating keys. If the activation key is not valid, block 474 logs the error message and block 476 informs the user of a possible error in entering the activation key. The process then terminates as indicated at 478.

For valid activation keys, block 480 determines whether the key has already been activated. Because this is a renewal process, it requires that the key be previously activated. If the key has not been activated as determined by block 480, an appropriate error message is logged at 482, the user is informed of a license violation at 484, and the key is revoked at 486. The process then terminates at 488.

For previously activated valid keys, block 490 determines whether the key has been previously revoked. If so, block 492 logs an appropriate error message. Block 494 informs the user of a license violation and the process terminates as indicated at 496.

If the requested renewal has been previously sent as determined by block 498, an appropriate error message is logged at 500. The user is informed of a license violation at 502 and the key is revoked at 504. The process then terminates at 506.

If the renewal has not been previously sent as determined at block 498, the account status is updated at 508 and the process terminates at 510.

FIGS. 13*a* and 13*b* is a block diagram illustrating a representative database for use in facilitating batch and interactive processing of functions administered by an authorized software representative according to one embodiment of the present invention. In the representative embodiment illustrated in FIGS. 13*a* and 13*b* the database preferably includes fields related to process administrators 530, protected software programs 550, activation keys 570, clients 590, licenses 610, and events 630. The various fields may be stored in a single database or may be distributed among a plurality of databases depending upon the particular application and implementation.

Fields related to process administrators 530 preferably include a corresponding log-in ID 532 and password 534. In addition, the process administrator's full name 536 and access rights or privileges 538 may be provided. Fields for tracking the date of the last password change 540 and a hashed password history 542 may also be provided.

The database may also include a catalog of protected software programs 550. This may include fields for unique program identifiers 552, market or trade names 554, vendor information 556, revision information 558, and private and public keys used for encrypting various information associated with each program as represented by reference numeral 560.

An activation key table or database 570 may also be provided. A typical activation key table 570 may include a program identifier field 572, activation key field 574, creation date 576, and customer ID 578.

The database may also include a client table 590 including a unique, random identifier field 592, along with contact information such as name 594, address 596, phone and fax numbers 598, and email addresses 600. In addition, the client table or database 590 may include the date of first registration 602 and fields for demographic and marketing information 604.

The server database may also include a table or database having fields linking clients, software, and licenses as represented by reference numeral 610. Table or database 610 may include a field for client ID 612 and program ID 614. In addition, identifying information relative to the first successful download 616, first unsuccessful download 618, last successful download 620, and last unsuccessful download 622 may be tracked within the table or database 610. A field for the expiration of the current license or authorization interval may also be provided as indicated at 624. A status field 626 may be used to indicate the current status of the license as active or revoked.

An event log table or database 630 may also be provided for tracking various types of events associated with various features of the present invention including but not limited to the security feature, quality assurance feature, and network license metering feature. Event log table 630 may include fields for an administrator ID 632, client ID 634, and program ID 636. In addition, an activation key field 638 may be provided to track any events or incidents by activation key. In addition, a data/time field 640 may be provided along with a type code field 642 which may be used to catagorize the type of event. A text field 646 may be provided to allow notes or a detailed description of the event.

As described above, a server preferably automatically exchanges information with the user computer using an electronic connection when required. In one preferred embodiment, the server encrypts license files using the RSA public key encryption algorithm when using an electronic connection. As an example, each release of each application program could be associated with a 512-byte encryption key pair. The server would maintain both the public and private keys with the private key hard coded into the license module of the software release.

License files will encode an expiration date, an activation key, and an application ID into a short string. An example of an unencrypted license file showing date, activation key, and application ID is:

20000625:0123456789987655431:AutoCD 2000 Release 1

The license string is preferably encrypted using the server's private key for that particular application release. The client software on the user computer or server will decrypt the license file using its hard-coded copy of the server's public key to verify that the license file originated with the authorized server. The license string may be stored in any convenient file or in memory for access by the license module. For example, the license string may be stored in the computer's registry.

To accommodate a wide variety of users, the present invention may also use a manual password update process. In this situation, it is not feasible to use a public-key encryption algorithm such as the one described above since the encrypted license file may occupy around 510 bytes, for example. This will correspond to around 90 principle characters or about 155 digits. This is too much text for a typical user to reliably transcribe from a telephone operator. Accordingly, a somewhat less secure process may be used for manual license file entry. Although somewhat less complex, the manual process includes extensive interlock security to deter unauthorized copying or use of the computer software. In addition, it may be unrealistic to expect a user to manually telephone the authorized software representative upon expiration of relatively short authorization intervals to get a new license file to continue using the software. Accordingly, extended authorization intervals may be provided for those users which require manual entry of the license file.

FIGS. 14a and 14b illustrate a system or method for batch distribution of computer software and associated authorization information which may be encrypted according to one embodiment of the present invention. Batches of installation media (such as floppy disks, CD-ROMs, DVDs, electronic software distribution, etc.) are preferably limited to a number of units based on the activation and encryption keys. For the example illustrated in FIGS. 14a and 14b, the batches are preferably limited to 1000 units each. Of course, this is an exemplary size and is not mandatory. Higher production runs are possible with increased table or file size for storing encryption and activation information.

As illustrated in FIG. 14a, a batch of installation media may be created by assigning a single random 64-byte master password to the batch as represented by block 650. A unique activation key for each copy is then created as represented by block 652. For each activation key, a random 128-byte encryption key is created as represented by block 654. An encrypted block of 128 bytes is then produced as indicated at 656. An encrypted block may be based on the master password plus a random 64-byte number with the encryption key for each activation key. This process will yield a table or database as illustrated in FIG. 14B, for example. The database may be stored on the server administered by the authorized software representative.

FIG. 14b illustrates an authorization table or database 670. The database may include fields to identify each copy of the installation media 672 along with corresponding activation keys 674 and encryption keys 676. A suitable encryption algorithm may be used to process the master key, encryption key, activation key, and random number to generate the encrypted key 678. In this example, a copy of the entire table, indexed by the activation key 674, would be stored on each copy of the installation media.

Figure 15:
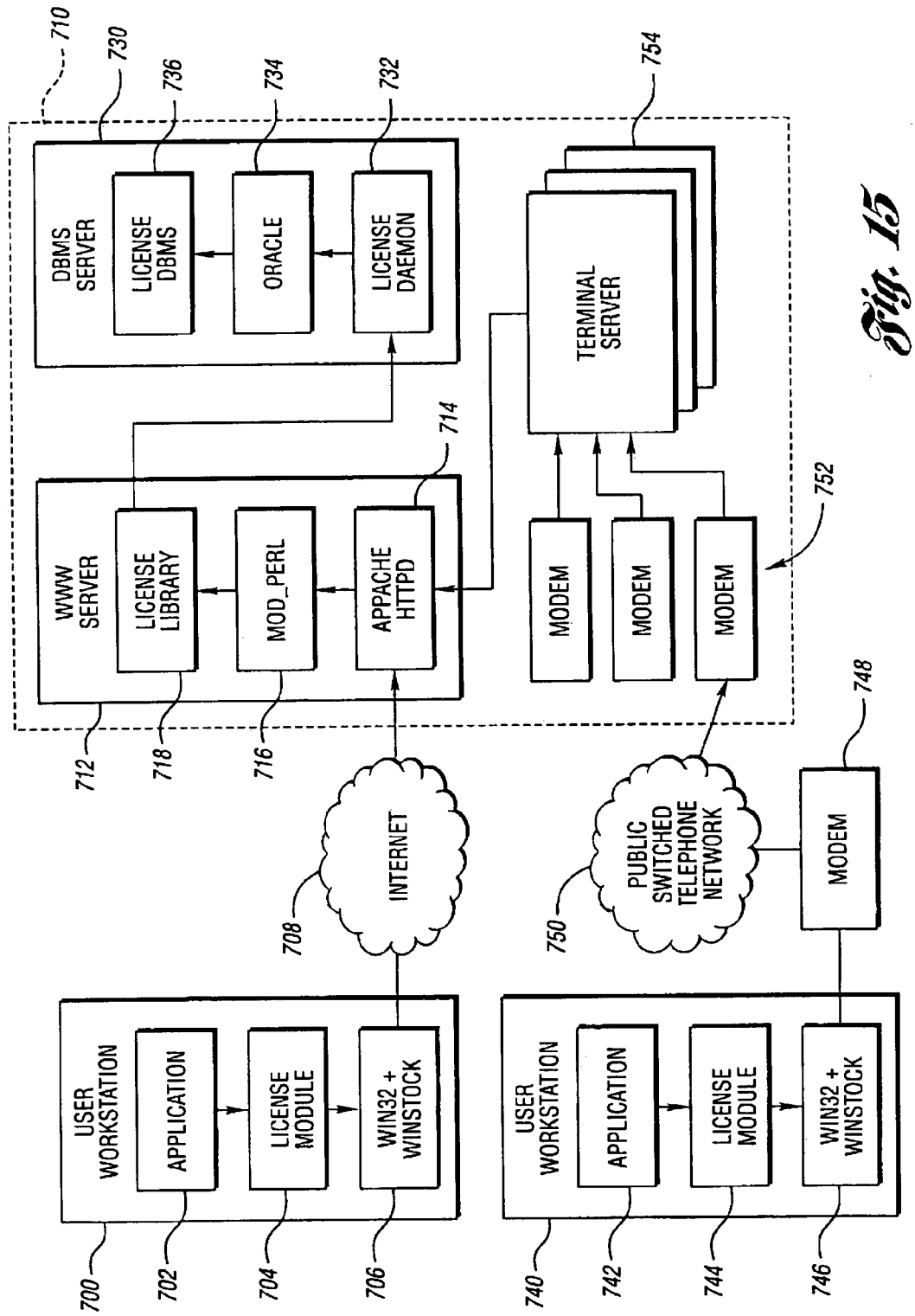
FIG. 15 is a block diagram illustrating a representative system for monitoring software according to one embodiment of the present invention.

FIG. 15 is a block diagram illustrating a representative system for monitoring software according to one embodiment of the present invention. A user computer or work station 700 includes computer software in the form of an application program 702 which is integrated with a monitoring or license module 704 according to the present invention. While illustrated with respect to the security feature of the present invention, those of ordinary skill in the art will recognize that license module 704 may be replaced by a generic monitoring module to perform the quality assurance and network license monitoring and metering features of the present invention. User computer or work station 700 also includes a protocol stack 706 for communicating with one or more other computers via a network 708 such as the Internet, for example. To obtain authorization codes for continued operation of the computer software, computer 700 preferably connects to an authorized software representative indicated generally by reference numeral 710 via computer network 708. In one embodiment of the present invention, user work station 700 contacts authorized software representative 710 using a web browser to access a corresponding server 712 remotely located relative to user work station 700. Server 712 includes a module 714 for receiving the activation key from computer 700, preferably electronically, and processing the key user encrypting language, for example, as indicated at block 716. Server 712 also includes licensed library module 718 which may be used to access a database server 730 to obtain subsequent authorization codes. License daemon 732 is used to access the license database 736 via a standard database management tool 734 such as Oracle, for example.

Work stations or computers, such as work station 740, which do not have Internet access, may also exchange electronic information with an authorized software representative according to the present invention. User work station 740 also includes an application program 742 integrated with a license module 744. As described above, license module 744 may be replaced by a generic monitoring module to implement various other features of the present invention. A communication program or protocol stack 746 may be used to communicate using an associated modem 748 with a modem pool 752 of the software representative 710 via a public switched telephone network 750.

Modem pool 752 is managed by a terminal server 754 which may interface with the web-based server 712 as illustrated. In addition, users may obtain manual authorization code updates by telephoning an operator who accesses web server 712 and/or database server 730 to obtain manual authorization codes as described above.

Figure 16:
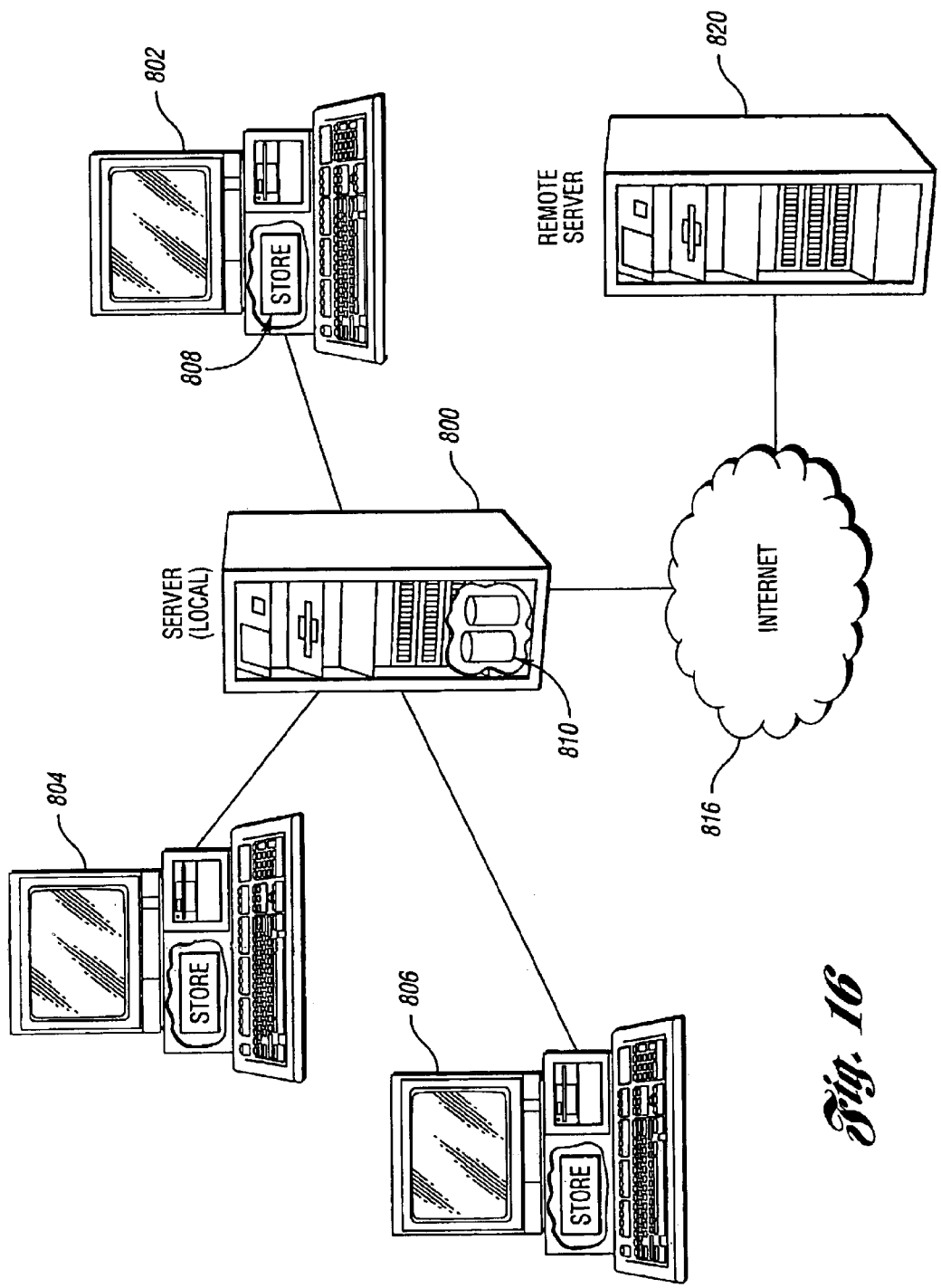
FIG. 16 is a block diagram illustrating an alternative embodiment of a system for auditing or metering network software which may include various quality assurance features according to one embodiment of the present invention.

Referring now to FIG. 16, a block diagram illustrating operation of a system for auditing or metering network software which may include various quality assurance features according to one embodiment of the present invention is shown. In this embodiment, a local server 800 is connected to one or more computers 802, 804, and 806 to form a local area network (LAN). One or more computers 802–806 may include associated local storage media indicated generally by reference numeral 808. Likewise, local server 800 may include storage media 810. Storage media 808 and/or 810 may be used to store various information associated with computers 802–806 which is subsequently repeatedly transferred to a remote server 820 via a computer network 816, such as the Internet, for example. Information stored in storage media 808 and 810 may include various types of data associated with operation of the monitored software to provide quality assurance capabilities in accordance with the present invention. For example, complete statistical data for use during an actor beta test cycles may be provided including full monitoring of errors, conflicts, use patterns, and the like. This information is collected by the monitoring module which is integrated with the computer software. The monitor module preferably stores information related to operation of the computer software on local server 800 and storage media 810, for example. This information is then repeatedly transferred to remote server 820 to provide the quality assurance capabilities and/or network license metering capabilities in accordance with the present invention.

Additional quality assurance capabilities provided by the system or method illustrated in FIG. 16 may include complete error log generation of program shutdowns with associated fault codes or error codes of all programs currently in use on a particular computer 802, 804, or 806. Likewise, a complete log of non-fatal errors of all programs in use by one or more computers 802–806 (and/or server 800) may be generated and periodically transferred to remote server 820 to determine use patterns, most used features and tools, etc. Likewise, use of help files may be analyzed to improve or revise the computer software. In addition, information related to use patterns and demographics of other computer application programs running on computers 802–806 may be stored or cached locally on server 800 prior to being transferred to remote server 820 via network or other connection 816. The system and method for quality assurance according to the present invention provides substantial flexibility to accommodate any desired audit parameters. For example, network licensing may be based on the number of concurrent computers using a particular application. Alternatively, a licensing model may be implemented which charges users based on each use or each authorization period for a particular application program.

As such, the present invention provides various systems and methods for repeatedly contacting a software user in exchanging information such as authorization codes, marketing, advertising, promotional information, and other information related to use of a particular monitored software application program. The present invention provides security features, quality assurance features, and network license compliance which may be administered remotely by a software developer, distributor, or third party.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for generating a plurality of authorization codes for use in monitoring software to reduce unauthorized copying or use of the software, the method comprising:

requiring a user of the software to contact an authorized software representative during installation of the software;

obtaining registration information from the user during contact with the authorized software representative;

obtaining an activation key associated with the software from the user during contact with the authorized software representative, upon entry the activation key enabling use of the software during first authorization interval having a finite period;

determining whether the user is an authorized user based on the registration information and the activation key;

supplying an authorization code from a plurality of authorization codes corresponding to the activation key based on the determination of whether the user is an authorized user; and repeatedly requiring entry of another authorization code prior to expiration of an associated authorization interval for continued use of the software beyond the associated authorization interval by prompting the user to obtain the authorization code for continued use of the software beyond the associated authorization interval prior to expiration of the associated authorization interval.

2. The method of claim 1 wherein obtaining an activation key includes entering the activation key by a user during registration of the software.

3. The method of claim 2 wherein the same activation key is associated with a predetermined number of copies of the software.

4. The method of claim 2 wherein the activation key is embedded within the software.

5. The method of claim 2 wherein the activation key comprises a plurality of alphanumeric characters.

6. The method of claim 1 further comprising:

encrypting the authorization code prior to supplying the authorization code to an authorized user of the software.

7. The method of claim 1 wherein the plurality of authorization codes is generated prior to distribution of the authorization codes.

8. The method of claim 1 wherein the step of supplying comprises:

supplying a master authorization code which disables the software if the user is an unauthorized user.

9. The method of claim 1 wherein the step of supplying comprises:

supplying a master authorization code which allows for indefinite use of the software.

10. The method of claim 1 wherein the step of supplying comprises:

supplying a master authorization coded which allows operation of the software for a predetermined period of time, wherein the master authorization code is not associated with any particular copy of the software.

11. The method of claim 1 further comprising:

transferring advertising, marketing, or promotional information to the user while supplying the authorization code.

12. The method of claim 1 wherein the step of determining comprises:

comparing the registration information with previously obtained registration information associated with the activation key; and determining that the user is an authorized user if no previously obtained registration information exists or if the previously obtained registration information substantially matches the registration information supplied by the user.

13. A method for generating a plurality of authorization codes for use in monitoring software to reduce unauthorized copying or use of the software, the method comprising:

requiring a user of the software to contact an authorized software representative during installation of the software;

obtaining registration information from the user during contact with the authorized software representative;

obtaining an activation key associated with the software from the user during contact with the authorized software representative, upon entry the activation key enabling use of the software during a first authorization interval having a finite period;

determining whether the user is an authorized user based on the registration information and the activation key;

supplying an authorization code from a plurality of authorization codes corresponding to the activation key based on the determination of whether the user is an authorized user;

wherein the step of supplying includes determining a password code based on the activation key, accessing a look-up table indexed by the password code to identify an algorithm for generating a plurality of passwords associated with a particular copy of the software, selecting one of the plurality of passwords to supply to the user, and repeatedly requiring entry of a different authorization code prior to expiration of an associated authorization interval for continued use of the software beyond the associated authorization interval.

14. The method of claim 13 further comprising encrypting the authorization code pr or to supplying the authorization code.

15. The method of claim 13 wherein the step of selecting one of the plurality of passwords comprises:

selecting one of the plurality of passwords based on a previously supplied password.

16. A method for monitoring software to reduce unauthorized use, the method comprising:

associating an authorization code with a copy of the software, the authorization code including a password code associated with a plurality of passwords which must be repeatedly entered prior to expiration of selected intervals for continued use of the software beyond the selected intervals, the authorization code being distributed with the copy of the software and the plurality of passwords being maintained by an authorized software representative;

obtaining the authorization code from a user or a user computer;

parsing the authorization code to determine the associated password code;

selecting one of the plurality of passwords associated with the password code;

providing the selected password to the user or the user computer to allow operation of the software for the selected interval;

prompting the user to obtain a new password from the plurality of passwords prior to expiration of the selected interval; and automatically and repeatedly contacting the authorized software representative prior to expiration of the selected interval to obtain the new password from the plurality of passwords to authorize continued use of the software for a subsequent interval after the selected interval.

17. The method of claim 16 further comprising encrypting the selected password before providing the password to the user or the user computer.

18. The method of claim 16 further comprising:

associating a customer code with a developer of the software; generating a serial number for each copy of the software; and combining the customer code, the serial number, and the password code to form the authorization code.

19. The method of claim 18 wherein the step of generating a serial number comprises generating a unique serial number for each copy of the software.

20. The method of claim 18 wherein the step of generating a serial number comprises generating an identical serial number for a predetermined number of copies of the software.

21. The method of claim 18 wherein the serial number comprises a plurality of alphanumeric characters.

22. The method of claim 16 wherein the step of obtaining comprises automatically obtaining the authorization code at predetermined intervals when the user computer is connected to the internet.

23. The method of claim 16 further comprising transferring advertising, marketing, or promotional information while obtaining the authorization code.

24. The method of claim 16, further comprising:

transferring advertising, marketing, or promotional information to the user, user computer, or software while providing the password.

25. The method of claim 16 wherein the step of selecting one of the plurality of passwords comprises:

selecting one of the plurality of passwords based on a previously selected password.

26. The method of claim 16 wherein the plurality of passwords is generated prior to distribution of the authorization code.

27. The method of claim 16 wherein the step of providing comprises:

providing a master password which disables the software if the user is an unauthorized user.

28. The method of claim 16 wherein the step of providing comprises:

providing a master password which allows for indefinite use of the software.

29. The method of claim 16 wherein the step of providing comprises:

providing a master password which allows operation of the software for a predetermined period of time, wherein the master password is not associated with any particular copy of the software.

30. The method of claim 16 wherein the step of providing comprises:

providing the password to a user for manual entry into the software.

31. The method of claim 16 wherein the step of providing comprises:

providing the password to a user for manual entry into the software to authorize use of the software for a predetermined interval.

32. The method of claim 16 wherein the step of providing comprises:

encoding the password prior to providing the password to the user or the user computer.

33. The method of claim 16 wherein the step of automatically contacting comprises establishing a connection over the internet using a browser application.

34. A method for monitoring software installed on a plurality of computers in communication with one another or a central computer to form a computer network, the method comprising:

associating an activation code with the software for authorizing a predetermined number of copies of the software to be installed on computers associated with the computer network, the activation code having a corresponding plurality of passwords;

collecting registration information from each computer associated with the computer network during installation of the software, providing a first password from the plurality of passwords to the computers associated with the computer network for the predetermined number of copies of the software to authorize operation of the software for a first interval;

requiring entry of another one of the plurality of passwords prior to expiration of the first interval for each copy of the software to continue operating beyond the first interval and starting a subsequent interval; and prompting each computer user prior to expiration of the first or subsequent intervals to contact an authorized software representative to obtain a subsequent password for continued operation of the software beyond the first or subsequent intervals so that enablement of the software can be continuous from the first interval to a subsequent interval without requiring further communication with the authorized software representative following entry of the subsequent password.

35. The method of claim 34 wherein the software automatically contacts an authorized software representative to obtain a subsequent password from the plurality of passwords associated with the activation code.

36. The method of claim 34 further comprising:

monitoring use of each computer to determining when the computer is idle; and automatically obtaining a subsequent password from the plurality of passwords for continued operation of the software when the computer is idle.

37. The method of claim 34 wherein each password includes information to uniquely identify a particular computer associated with the computer network.

38. The method of claim 34 further comprising encrypting the passwords prior to providing the passwords to the computers associated with the computer network.

39. The method of claim 34 wherein the plurality of passwords are related such that subsequent passwords are determined based on one or more previous passwords.

40. The method of claim 34 further comprising:

collecting registration information from each computer associated with the computer network during contact between each computer user and the authorized software representative;

comparing the registration information to previously collected registration information associated with the activation code; and providing a subsequent password only if the registration information substantially matches the previously collected registration information for the activation code.

\* \* \* \* \*